(12) United States Patent
Sakamoto

(10) Patent No.: US 7,779,630 B2
(45) Date of Patent: Aug. 24, 2010

(54) HYDRAULIC STEPLESS SPEED CHANGING DEVICE

(75) Inventor: Kunihiko Sakamoto, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 493 days.

(21) Appl. No.: 11/574,228

(22) PCT Filed: Sep. 14, 2004

(86) PCT No.: PCT/JP2004/013371

§ 371 (c)(1),
(2), (4) Date: Jun. 20, 2007

(87) PCT Pub. No.: WO2006/022032

PCT Pub. Date: Mar. 2, 2006

(65) Prior Publication Data

US 2008/0041049 A1 Feb. 21, 2008

(30) Foreign Application Priority Data

Aug. 24, 2004 (JP) .............................. 2004-244292

(51) Int. Cl.
*F16B 31/02* (2006.01)
(52) U.S. Cl. ........................................................ 60/445
(58) Field of Classification Search ................... 60/444, 60/447, 449
See application file for complete search history.

(56) References Cited

U.S. PATENT DOCUMENTS 4,543,787 A * 10/1985 Eckhardt .................... 60/444
5,184,466 A * 2/1993 Schniederjan et al. ......... 60/449
6,351,945 B1 3/2002 Stickel
6,684,634 B1 * 2/2004 Sakamoto ..................... 60/444

FOREIGN PATENT DOCUMENTS

| JP | 50-20656 | 7/1975 |
| JP | 58-65364 | 4/1983 |
| JP | 6-17928 | 1/1994 |

* cited by examiner

*Primary Examiner*—F. Daniel Lopez
(74) *Attorney, Agent, or Firm*—Sterne, Kessler, Goldstein & Fox P.L.L.C.

(57) ABSTRACT

It is an object to accurately control swash plate angles of movable swash plates of a hydraulic pump and/or a hydraulic motor. In a hydraulic stepless speed changing device, a hydraulic pump and/or a hydraulic motor, at least one of which is of a variable displacement type, and a hydraulic servo mechanism for controlling swash plate angles of movable swash plates of the hydraulic pump and/or the hydraulic motor are integrated and the movable swash plates are tilted thorough operation of a speed change operation lever. Load control mechanisms are formed by integrally providing actuators having a cylinder, a spool, and the like for sliding speed change drive members to the speed reduction side, the speed change drive members tilting the movable swash plates of the hydraulic servo mechanism. The load control mechanisms are actuated by pressurized oil led from a main oil path of a closed circuit formed by connecting the hydraulic pump and the hydraulic motor to the actuators.

9 Claims, 12 Drawing Sheets

HYDRAULIC STEPLESS SPEED CHANGING DEVICE

BACKGROUND OF THE INVENTION

1. Field of the Invention

The present invention relates to a hydraulic stepless speed changing device and more particularly to a technique of controlling swash plate angles of movable swash plates of a hydraulic pump and/or a hydraulic motor forming the hydraulic stepless speed changing device.

2. Background Art

Conventionally, there is a known structure of a hydraulic stepless speed changing device (hereafter abbreviated as "HST") formed of a hydraulic pump and a hydraulic motor, in which a hydraulic servo mechanism controls tilting of movable swash plates of the hydraulic pump and the hydraulic motor to adjust capacities of variable displacement type hydraulic pump and hydraulic motor. As a structure of the hydraulic servo mechanism, a mechanism (automotive control) in which a solenoid valve mounted to the hydraulic pump or the HST automatically tilts the movable swash plates in proportion to an increase of a rotational speed of the hydraulic pump, a mechanism (manual servo control) in which a speed change operation lever mounted to an outer portion of the HST operates the movable swash plate of the hydraulic pump, and the like are known.

On the other hand, the HST having a mechanism (load control mechanism) for carrying out speed control in such manners as to reduce a traveling speed of a work vehicle when a load of an engine is a set value or greater and to increase the traveling speed when the load of the engine is the set value or smaller is known. To put it concretely, the movable swash plate of the HST (hydraulic pump) is shifted to a speed reduction side so that a work load does not exceed a predetermined value to thereby prevent stalling.

As the HST having such hydraulic servo mechanism and load control mechanism, there is an HST as disclosed in Patent Document 1, for example. This HST includes a variable displacement-type hydraulic pump and two hydraulic motors operated by pressurized oil by the hydraulic pump. At least one of the two hydraulic motors is a variable displacement-type hydraulic motor and an output combining mechanism for combining respective output rotations of the two hydraulic motors to take out a single output rotation is provided. With this structure, the output rotation of the variable displacement-type hydraulic motor is adjusted to substantially double output torque to increase the maximum torque in the HST.

The HST disclosed in the Patent Document 1 includes a hydraulic servo mechanism in which a speed changing valve switches a speed changing cylinder interlocked with a movable swash plate to tilt the movable swash plate in the hydraulic pump and movable swash plates of the hydraulic motors can be tilted. With this structure, if load torque on the engine increases during work of the work vehicle at a slushy place or the like, the movable swash plate of the one hydraulic motor formed as the variable displacement-type motor is tilted to thereby increase low-speed torque to perform speed control of the work vehicle.

Patent Document 1: Japanese Unexamined Patent Publication No. 2004-11769

It is true that, with the structure of the HST described in the Patent Document 1, when output rotation of one of the hydraulic motors cannot provide sufficient torque to the work vehicle during traveling of the work vehicle, hydraulic pressure in a main oil path is supplied to or discharged from a switching cylinder to automatically tilt the movable swash plate of the other hydraulic motor. With such a load control mechanism, it is possible to solve the insufficiency of torque to thereby prevent stalling and the like.

However, in the HST disclosed in the Patent Document 1, though the above-described load control mechanism can make up for the insufficiency of torque of the other hydraulic motor by disposing one of the motors as the variable displacement-type hydraulic motor, the movable swash plate of the variable displacement-type hydraulic motor can only be switched by the switching cylinder between a tilted state and a state of zero degree of a swash plate angle. Therefore, accuracy of control of the swash plate angle of the movable swash plate is poor and alignment at a middle angle or the like is impossible. Moreover, it is necessary to dispose at least two hydraulic motors in the main oil path, which complicates the structure and narrows a scope of application. Furthermore, because cradle metal of the hydraulic pump or the like deteriorates and traveling performance changes with the passage of time, it is necessary to make allowances in advance in setting structures of respective members forming the load control mechanism. Moreover, the load control mechanism is for controlling the movable swash plate of the hydraulic motor and cannot be applied to control of the movable swash plate of the hydraulic pump.

It is an object to provide a hydraulic stepless speed changing device for accurately controlling swash plate angles of movable swash plates of a hydraulic pump and/or a hydraulic motor in the HST having a load controlling function.

BRIEF SUMMARY OF THE INVENTION

According to the invention, there is provided a hydraulic stepless speed changing device in which a hydraulic pump and a hydraulic motor, both of which are of a variable displacement type, and a hydraulic servo mechanism for controlling swash plate angles of respective movable swash plates of the hydraulic pump and the hydraulic motor are integrated and the movable swash plate of the hydraulic pump or the hydraulic motor is tilted through operation of a speed change operation lever, wherein load control mechanisms are formed by integrally providing respective actuators of the hydraulic pump and the hydraulic motor for sliding speed change drive members to the speed reduction side, the speed change drive members tilting the respective movable swash plates of the hydraulic servo mechanism, the load control mechanisms being actuated by pressurized oil led from a main oil path of a closed circuit formed by connecting the hydraulic pump and the hydraulic motor to the respective actuators.

In the hydraulic stepless speed changing device, the load control mechanism formed on the hydraulic pump side is formed of a cylinder to and from which the pressurized oil in the main oil path is supplied and discharged, a spool for the hydraulic pump slidably inserted in the cylinder and engaged with the speed change drive member, and an elastic member for biasing the spool for the hydraulic pump to one side, the main oil path communicates with the other side of the spool for the hydraulic pump, and the spool moves against the biasing force of the elastic member while being engaged with the speed change drive member at the time of load control to control the swash plate angle of the movable swash plate of the hydraulic pump independently of the tilting operation through the speed change operation lever.

In the hydraulic stepless speed changing device of the invention, the load control mechanism formed on the hydraulic motor side is formed of a cylinder to and from which the pressurized oil in the main oil path is supplied and discharged and a spool for the hydraulic motor slidably inserted in the cylinder and engaged with the speed change drive member. The main oil path communicates with the other end side of the spool for the hydraulic motor, and an elastic member or hydraulic force for substantially constantly pressing the spool for the hydraulic motor against a force of the pressurized oil in the main oil path is provided on one end side of the spool. The spool controls the swash plate angle of the movable swash plate of the hydraulic motor independently of the tilting operation through the speed change operation lever so that hydraulic pressure in the main oil path becomes substantially constant.

In the hydraulic stepless speed changing device of the invention, the spool for the hydraulic pump and the spool for the hydraulic motor are respectively integrally provided to the cylinder in the load control mechanisms formed on the hydraulic pump side and the hydraulic motor side.

In the hydraulic stepless speed changing device of the invention, a pin for pressing the spool when it receives the pressurized oil in the main oil path is provided to one end side of a cylinder hole in which the spool is inserted and charge pressure is introduced to the other end side of the cylinder hole to resist the pressing of the spool by the pin in at least one of the load control mechanisms formed on the hydraulic pump side and the hydraulic motor side.

In the hydraulic stepless speed changing device of the invention, the load control mechanism formed on the hydraulic pump side controls the swash plate angle of the movable swash plate of the hydraulic pump so that traction of the hydraulic speed changing device during low-speed traveling becomes substantially half of traction of an engine horsepower.

In the hydraulic stepless speed changing device of the invention, a reverse-side capacity of the hydraulic pump is restricted to make a corner horsepower slightly lower than an engine output, and thus a relief pressure curve in a hydraulic motor control region during reverse traveling substantially agrees with an engine horsepower curve without exceeding it.

In other words, in the hydraulic stepless speed changing device of the invention, the load control mechanisms are formed by integrally providing respective actuators of the hydraulic pump and the hydraulic motor for sliding the speed change drive members to the speed reduction side, the speed change drive members tilting the respective movable swash plates of the hydraulic pump and the hydraulic motor of the hydraulic servo mechanism, the load control mechanisms being actuated by pressurized oil led from the main oil path of the closed circuit formed by connecting the hydraulic pump and the hydraulic motor to the actuators. Therefore, it is possible to accurately control the respective movable swash plates. As a result, if the load is applied and the hydraulic pressure increases in the main oil path in the hydraulic stepless speed changing device for driving a traveling device, the actuators are actuated according to the hydraulic pressure to turn the movable swash plates to the speed reduction side to reduce a traveling speed to increase traction, thereby preventing stalling. Because the movable swash plates are automatically tilted to prevent stalling when the load is applied, operation at the time of traveling operation becomes easy. Moreover, because the hydraulic servo mechanism, the neutral position retaining mechanism, and the load control mechanisms can be formed integrally, the control mechanism can be made compact and assembly and the like can be carried out easily.

In the hydraulic stepless speed changing device of the invention, the load control mechanism formed on the hydraulic pump side is formed of the cylinder to and from which the pressurized oil in the main oil path is supplied and discharged, the spool for the hydraulic pump slidably inserted in the cylinder and engaged with the speed change drive member, and the elastic member for biasing the spool for the hydraulic pump to one side. The main oil path communicates with the other side of the spool for the hydraulic pump, and the spool moves against the biasing force of the elastic member while being engaged with the speed change drive member at the time of load control to control the swash plate angle of the movable swash plate of the hydraulic pump independently of the tilting operation through the speed change operation lever. Because the load control mechanism formed on the hydraulic pump side slides the spool for the hydraulic pump and engages the spool for the hydraulic pump with the pin to move the pin against the biasing force of the elastic member, it is possible to accurately control the movable swash plate of the hydraulic pump. By inserting the elastic member, it is possible to miniaturize the load control mechanism on the hydraulic pump side formed of the cylinder and the like and to reduce the number of parts.

In the hydraulic stepless speed changing device of the invention, the load control mechanism formed on the hydraulic motor side is formed of the cylinder to and from which the pressurized oil in the main oil path is supplied and discharged and the spool for the hydraulic motor slidably inserted in the cylinder and engaged with the speed change drive member. The main oil path communicates with the other end side of the spool for the hydraulic motor, the elastic member or hydraulic force for substantially constantly pressing the spool for the hydraulic motor against the force of the pressurized oil in the main oil path is provided on one end side of the spool, and the spool controls the swash plate angle of the movable swash plate of the hydraulic motor independently of the tilting operation through the speed change operation lever so that hydraulic pressure in the main oil path becomes substantially constant. Therefore, it is possible to accurately and finely tilt the movable swash plate of the hydraulic motor and to efficiently generate the maximum output. Moreover, in the hydraulic motor control region, it is possible to easily approximate the engine horsepower curve.

In the hydraulic stepless speed changing device of the invention, the spool for the hydraulic pump and the spool for the hydraulic motor are respectively integrally provided to the cylinder in the load control mechanisms formed on the hydraulic pump side and the hydraulic motor side. Therefore, it is possible to attach or detach the plurality of load control mechanisms at a time by attaching or detaching the cylinder, which improves workability in attachment and detachment and makes maintenance of the load control mechanisms easy.

In the hydraulic stepless speed changing device of the invention, a pin for pressing the spool when it receives the pressurized oil in the main oil path is provided to one end side of a cylinder hole in which the spool is inserted and charge pressure is introduced to the other end side of the cylinder hole to resist the pressing of the spool by the pin in at least one of the load control mechanisms formed on the hydraulic pump side and the hydraulic motor side. Therefore, the charge pressure necessary for the hydraulic stepless speed changing device can be utilized, automatic control is possible with the simple structure, and the elastic member can be downsized to obtain an inexpensive biasing means. Moreover, the spool can be slid accurately and accuracy of control of the movable swash plate by the load control mechanism is enhanced. Furthermore, the respective load control mechanisms can be formed of substantially the same parts to simplify the manufacturing process.

In the hydraulic stepless speed changing device of the invention, the load control mechanism formed on the hydraulic pump side controls the swash plate angle of the movable swash plate of the hydraulic pump so that traction of the hydraulic speed changing device during low-speed traveling becomes substantially half of traction of an engine horsepower. Therefore, it is possible to provide a margin with respect to the engine horsepower in advance. Thus, even if the operation that increases the load torque is carried out, it is possible to reliably prevent stalling.

In the hydraulic stepless speed changing device of the invention, the reverse-side capacity of the hydraulic pump is restricted to make the corner horsepower slightly lower than the engine output and thus the relief pressure curve in the hydraulic motor control region during reverse traveling substantially agrees with the engine horsepower curve without exceeding it. By employing it on the reverse side on which the load is small, it is possible to prevent stalling at low cost and without impairing the traveling performance.

BRIEF DESCRIPTION OF THE DRAWINGS/FIGURES

Figure 9:
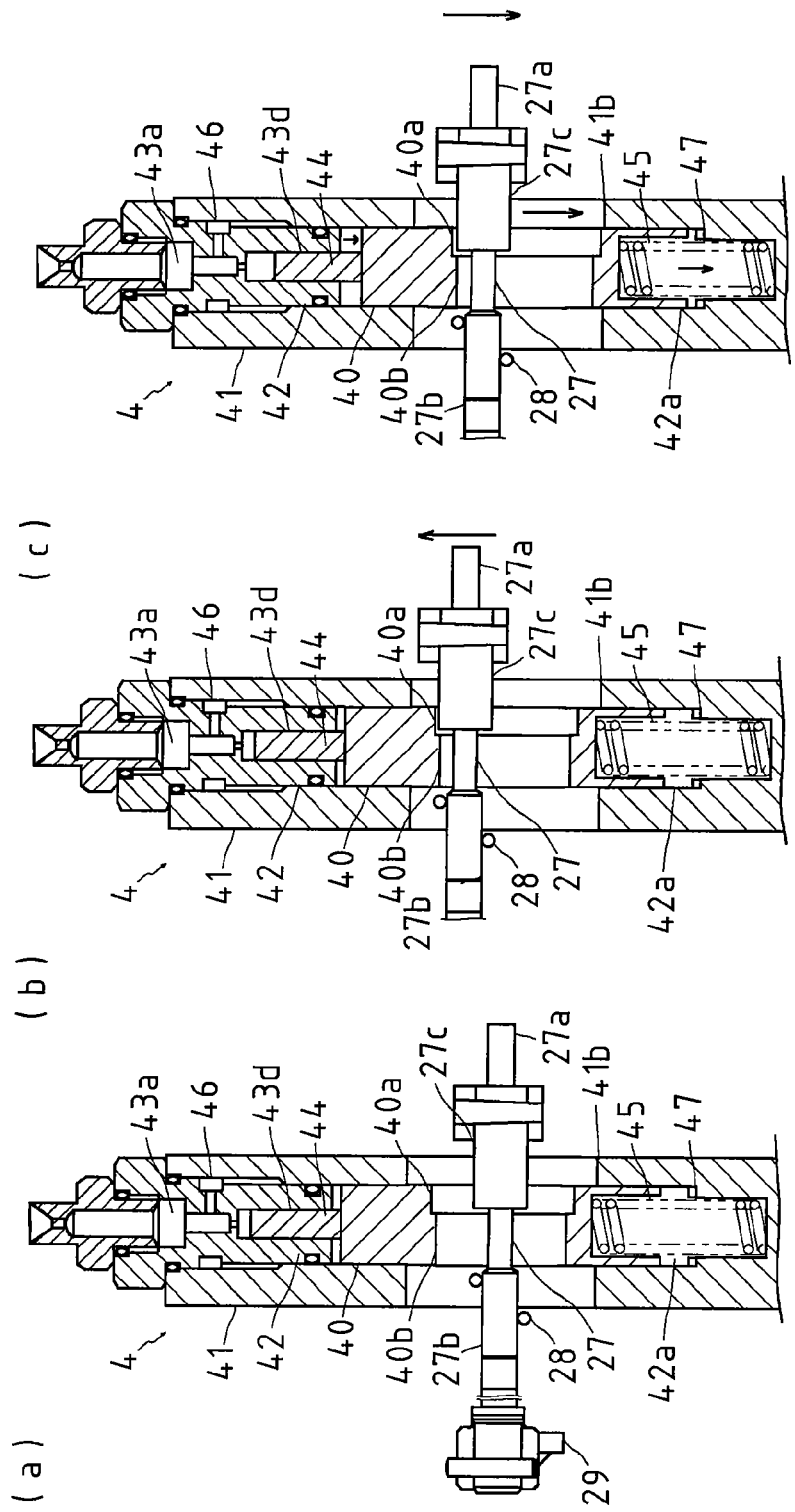

FIGS. 9(a) to 9(c) are state diagrams showing an example of a control mechanism by the load control mechanism.

Figure 10:
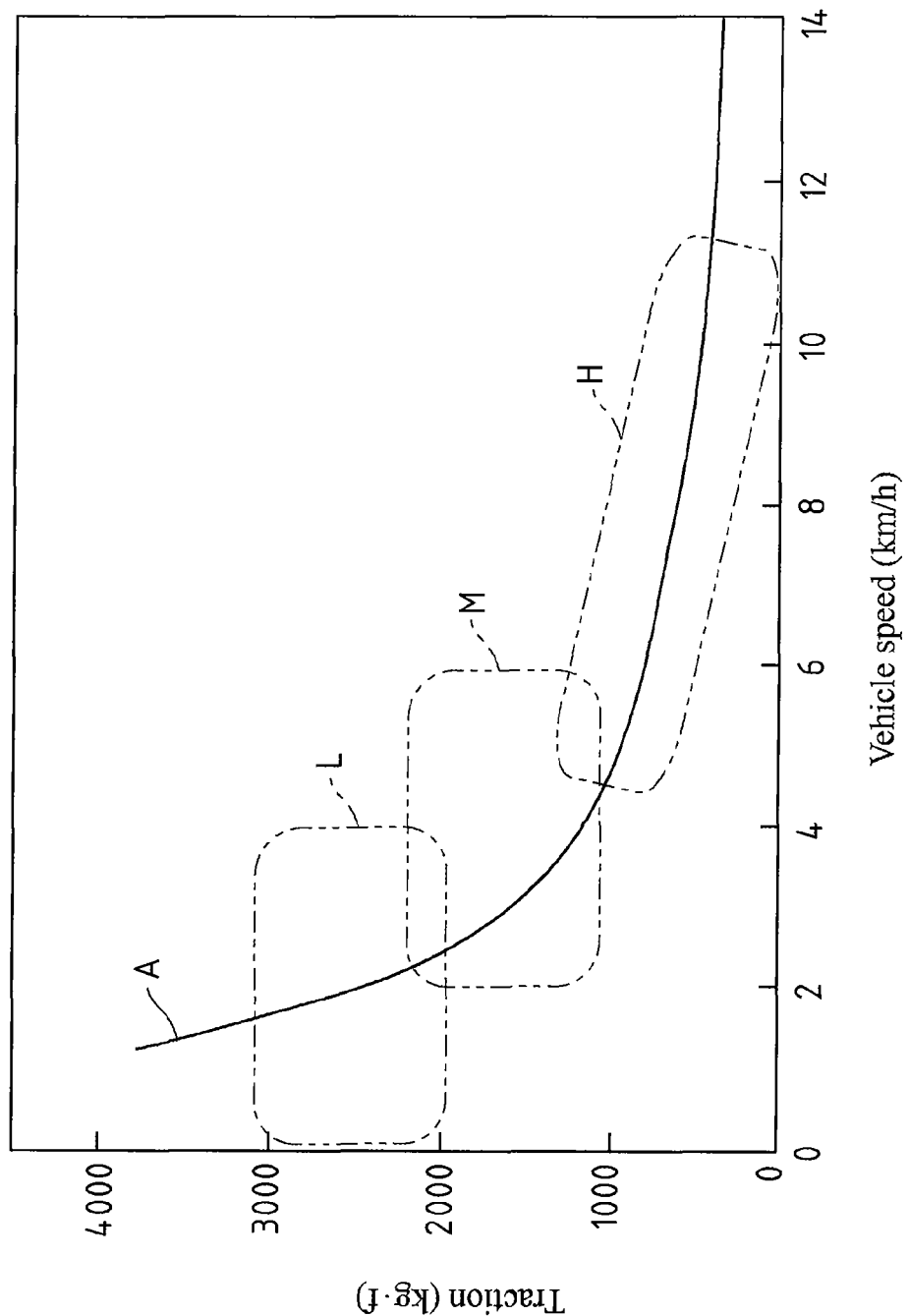

FIG. 10 is an engine horsepower diagram.

Figure 11:
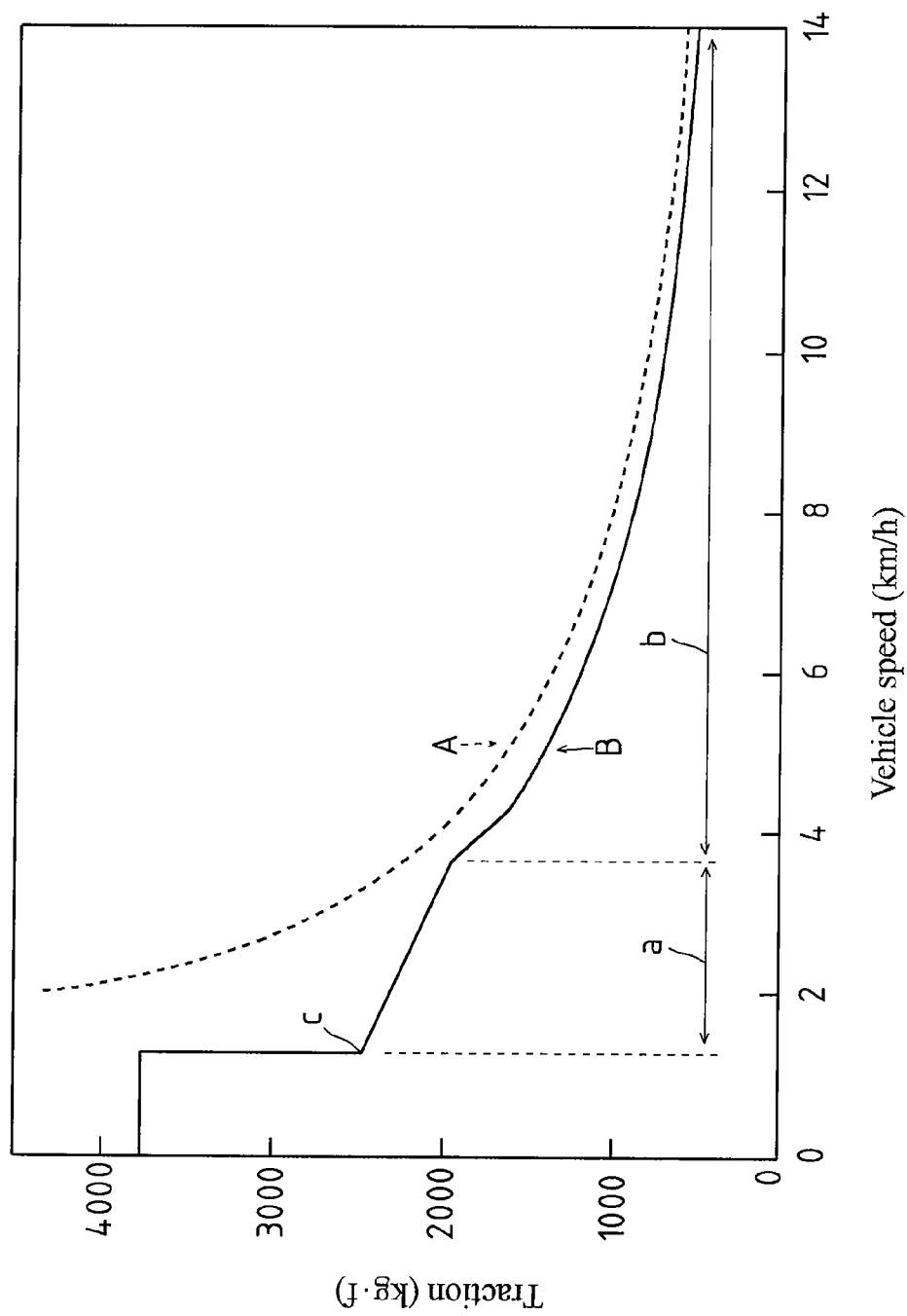

FIG. 11 is a drawing showing a relationship of traction to vehicle speed.

Figure 12:
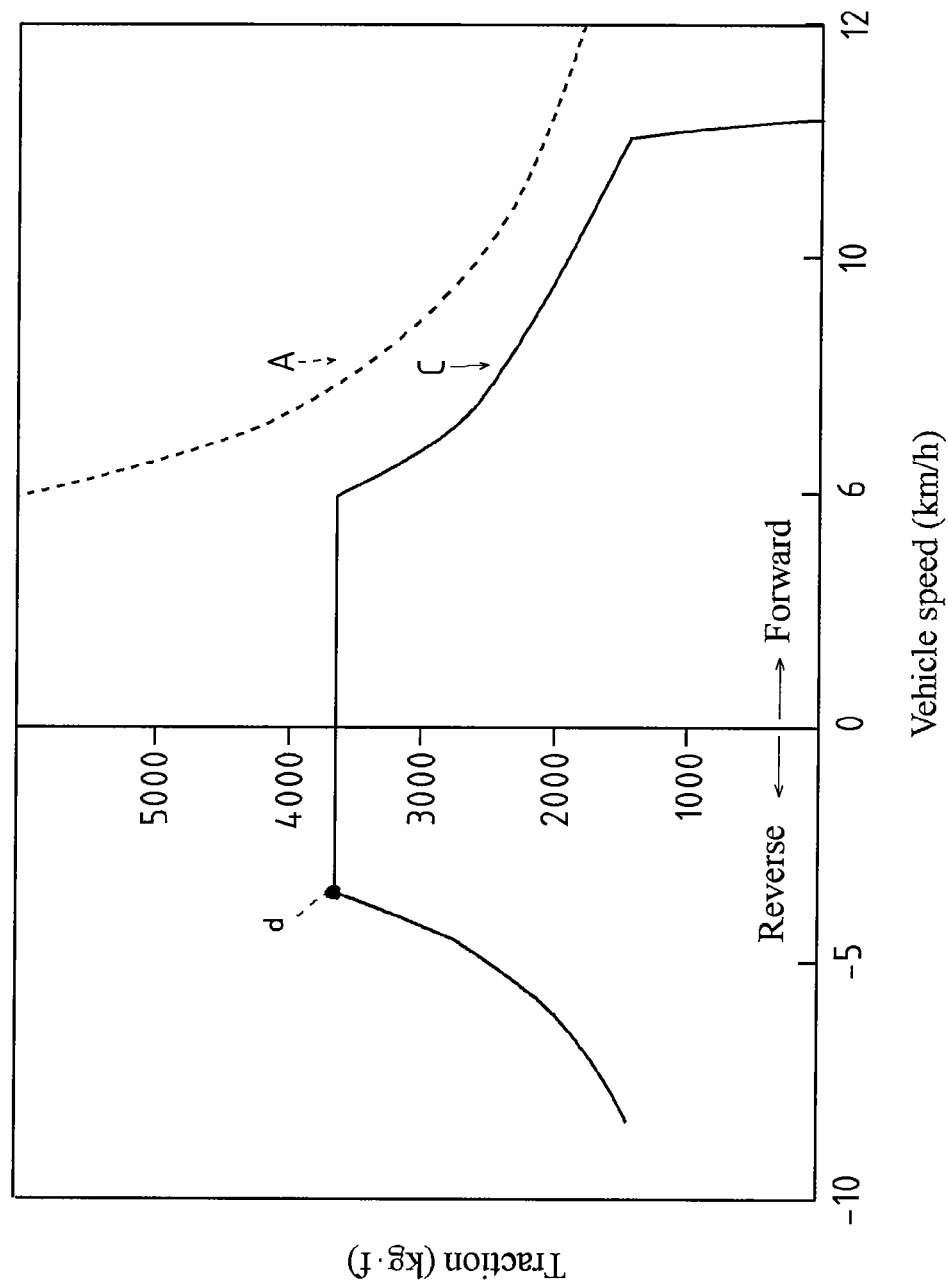

FIG. 12 is a drawing showing a relationship between relief pressure and an engine horsepower curve.

DETAILED DESCRIPTION OF THE INVENTION

Next, an embodiment of the present invention will be described. A hydraulic stepless speed changing device (hereafter abbreviated as "HST") 1 according to the present embodiment can be used for a work vehicle for farm work such as a tractor. In the following embodiment, a case in which the HST 1 is mounted on a work vehicle having a loader work machine as a work machine will be described.

Figure 1:
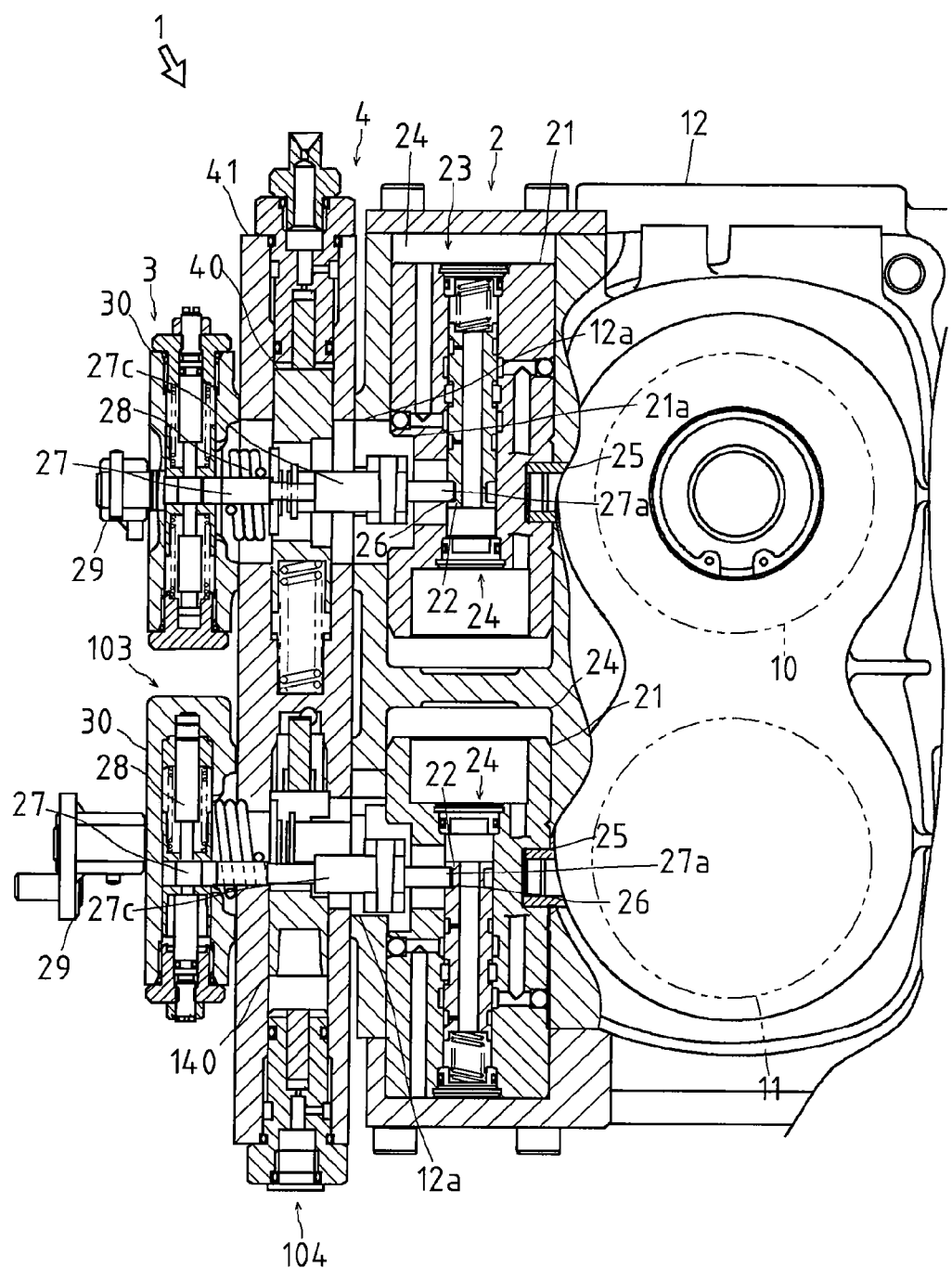
FIG. 1 is a front and partially-sectional view of an overall structure of a hydraulic stepless speed changing device according to the present invention.

First, an overall structure of the hydraulic stepless speed changing device according to the invention will be described below. As shown in FIG. 1, in the HST 1, a hydraulic pump 10 and a hydraulic motor 11 both of which are of a variable displacement type are enclosed in a housing 12. Besides them, provided in the housing 12 are hydraulic servo mechanisms 2, 2 as mechanisms for adjusting swash plate angles of movable swash plates 10a, 11a of the hydraulic pump 10 and hydraulic motor 11 to control output rotations of the respective hydraulic pump 10 and hydraulic motor 11, neutral position retaining mechanisms 3 (maximum swash plate position retaining mechanisms 103), load control mechanisms 4, 104, and the like. The hydraulic servo mechanisms 2, 2, the neutral position retaining mechanisms 3 (or maximum swash plate position retaining mechanisms 103), and the load control mechanisms 4 and 104 are provided in pairs to the hydraulic pump 10 and hydraulic motor 11.

The hydraulic servo mechanism 2, the neutral position retaining mechanism 3, and the like of the hydraulic pump 10 will be described below unless otherwise specified. In other words, in the embodiment, these structures (the hydraulic servo mechanisms 2, 2, the neutral position retaining mechanisms 3 (maximum swash plate position retaining mechanisms 103)) disposed at the hydraulic pump 10 and hydraulic motor 11 are not different from each other and have substantially the same structures.

Although it is preferable that both of the hydraulic pump 10 and hydraulic motor 11 are of the variable displacement type in the embodiment for a reason which will be described later, at least one of them may be of the variable displacement type and the other may be of a fixed displacement type. For example, it is possible that the hydraulic pump 10 is of the variable displacement type while the hydraulic motor 11 is of the fixed displacement type, or it is also possible that the hydraulic motor 11 is of the variable displacement type while the hydraulic pump 10 is of the fixed displacement type. Although a case in which the hydraulic pump 10 and hydraulic motor 11 are of the variable displacement type will be described in the embodiment unless otherwise specified, it is needless to say that the embodiment is not limited to this case from the above description.

Figure 7:
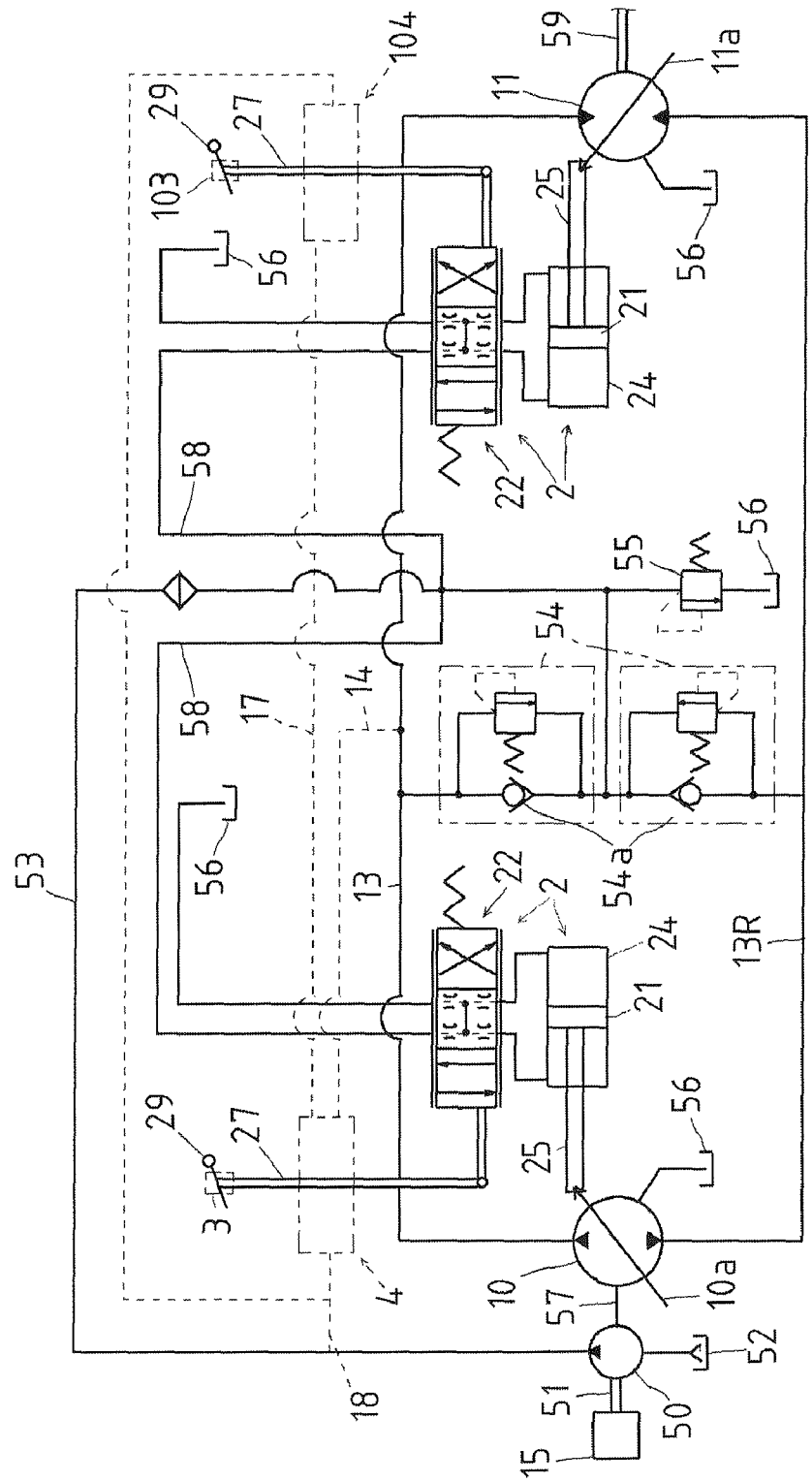
FIG. 7 is a hydraulic circuit diagram of a hydraulic stepless speed changing device.

Here, as shown in FIG. 7, the variable displacement-type hydraulic pump 10 is formed of a drive shaft 57, a cylinder block (not shown), a plunger (not shown), the movable swash plate 10a in contact with the plunger, and the like. A head portion of the plunger is in contact or engaged with the movable swash plate 10a to change a sliding amount of the movable swash plate 10a to thereby adjust a discharge amount of hydraulic oil from the hydraulic pump 10. The variable displacement-type hydraulic motor 11 is formed of a cylinder block (not shown), a plunger (not shown), and the movable swash plate 11a in contact with the plunger similarly to the variable displacement-type hydraulic pump 10. A head portion of the plunger is in contact or engaged with the movable swash plate 11a to change a sliding amount of the movable swash plate 11a to thereby make a suction amount of pressurized oil by the hydraulic motor 11 adjustable. The hydraulic pump 10 and hydraulic motor 11 are arranged side by side substantially in parallel on the same face of an oil path plate (not shown) and pressurized oil is supplied from the hydraulic pump 10 to the hydraulic motor 11 via a main oil path 13. With this structure, driving force from an engine 15 is input to the drive shaft 57 to drive the hydraulic pump 10. The pressurized oil discharged by the driving force of the hydraulic pump 10 is supplied to the hydraulic motor 11. The hydraulic motor 11 is driven by supply and discharge of the pressurized oil and driving force of the hydraulic motor 11 is transmitted to an output shaft 59.

Next, the hydraulic servo mechanism 2 will be described. As shown in FIG. 1, in the HST 1, the hydraulic pump 10 and the hydraulic motor 11 are arranged side by side in upper and lower positions (or in left and right positions). The hydraulic servo mechanism 2 for the hydraulic pump 10 is disposed on one side of the hydraulic pump 10 and the hydraulic servo mechanism 2 for the hydraulic motor 11 is similarly disposed on one side of the hydraulic motor 11 and below the hydraulic servo mechanism 2. Each hydraulic servo mechanism 2 is formed of a manual swash plate angle control valve 23 including a piston 21 and a spool 22 disposed in the piston 21 and the like. The hydraulic servo mechanisms 2 are housed in the housing 12 of the HST 1 and respectively formed integrally.

The hydraulic servo mechanism 2 includes the manual swash plate angle control valve 23. To put it concretely, a cylinder chamber 24 is formed in the housing 12 and at a side portion of the movable swash plate 10a of the hydraulic pump 10, the piston 21 is housed in the cylinder chamber 24, and a pin shaft 25 protruding from the side portion of the movable swash plate 10a is fitted in a side face of the piston 21. A through hole is formed at a position of an axial center of the piston 21 and the spool 22 is slidably fitted in the through hole.

The piston 21 is formed with an oil path through which an upper portion and a lower portion of the cylinder chamber 24 communicate with each other. By sliding of the spool 22, the oil path is opened or closed to send the pressurized oil into oil chambers above and below the piston 21 to thereby cause the piston 21 to slide up and down. A fitting groove 26 is formed at an outer periphery of a lower portion of the spool 22, and one end portion 27a of a pin 27 as a speed change drive member of the spool 22 is fitted in the fitting groove 26. The other end portion 27b of the pin 27 is pinched by a torsion spring 28 forming the neutral position retaining mechanism 3 and the like which will be described later. The one end portion 27a of the pin 27 is inserted into the housing 12 through an opening 12a and an opening 21a open in side faces of the housing 12 and the piston 21 and is fitted in the fitting groove 26 as described above.

By turning a speed change operation lever 29 of the hydraulic servo mechanism 2 interlocked and coupled with the pin 27, the pin 27 moves in a vertical direction (vertical direction in FIG. 1) against a biasing force of the torsion spring 28 and the spool 22 moves in the vertical direction as the pin 27 moves. In this manner, by sliding the spool 22 of the manual swash plate angle control valve 23 to change the oil path to slide the piston 21, the movable swash plate 10a is tilted to change speed of the HST 1.

Next, the neutral position retaining mechanism 3 and the like will be specifically described below. As shown in FIGS. 2 to 5, the neutral position retaining mechanism 3 is provided to the speed change operation lever 29 of the hydraulic servo mechanism 2 and structured to retain a neutral position of the movable swash plate 10a of the hydraulic pump 10. The neutral position retaining mechanism 3 is provided in a casing 30 and a detent rod 31 is provided to be slidable in a longitudinal direction (vertical direction in FIG. 2) in a space 30a in the casing 30. One end of the detent rod 31 is supported in a support recessed portion 30b of the casing 30 and the other end is supported by a cap 32 screwed into the casing 30.

The end portion of the detent rod 31 on the cap 32 side is integrally formed with an adjust bolt 33 screwed into the cap 32. The detent rod 31 can be slid in the longitudinal direction by rotating the adjust bolt 33 and is normally fixed in its position by a lock nut 34. A fixing portion 31a is formed at a substantially central portion of the detent rod 31 and the other end portion 27b of the pin 27 is inserted into the space 30a of the casing 30 to be aligned with a position of the fixing portion 31a. A diameter of the other end portion 27b of the pin 27 and a width (length toward an axial center of the detent rod 31) of the fixing portion 31a are formed to be substantially equal to each other.

In the space 30a of the casing 30, spring receivers 35, 35 are provided slidably toward the axial center of the detent rod 31 on opposite sides of the fixing portion 31a of the detent rod 31. The spring receivers 35, 35 are biased toward the fixing portion 31a by a spring 36 interposed between the casing 30 and the spring receiver 35 and a spring 36 interposed between the cap 32 and the spring receiver 35. Between the spring receivers 35, 35, both the fixing portion 31a of the detent rod 31 and the other end portion 27b of the pin 27 are sandwiched from opposite sides.

The speed change operation lever 29 is supported by the casing 30 for turning about a turning shaft 37. The torsion spring 28 is fitted for turning over an outer peripheral portion of the turning shaft 37 and the other end portion 27b of the pin 27 is pinched by the torsion spring 28. An interlocked arm 39 for turning with the turning shaft 37 is secured to the turning shaft 37 and is pinched by the torsion spring 28.

When the speed change operation lever 29 is turned, the interlocked arm 39 secured to the turning shaft 37 and the torsion spring 28 for pinching the interlocked arm 39 are turned together, and the pin 27 pinched by the torsion spring 28 is also turned together with the torsion spring 28. In other words, if the speed change operation lever 29 is turned, the pin 27 is turned together through the interlocked arm 39 and the torsion spring 28 to slide the spool 22. In this manner, the speed change operation lever 29, the turning shaft 37, the interlocked arm 39, the torsion spring 28, and the like form a speed change operation lever portion.

When the speed change operation lever 29 is not turned, because the other end portion 27b of the pin 27 is sandwiched together with the fixing portion 31a of the detent rod 31 between the spring receivers 35, 35, a turning position of the pin 27 is retained in the position of the fixing portion 31a. In the HST 1 of the embodiment, in a state in which the operating force is not applied to the speed change operation lever 29 and the pin 27 is retained in a position of the one end portion 27a by the spring receivers 35, 35, the movable swash plate 10a of the hydraulic pump 10 is adjusted to be positioned in the neutral position. In this manner, the neutral position retaining mechanism 3 is structured to retain the movable swash plate 10a of the hydraulic pump 10 of the HST 1 in the neutral position by the detent rod 31, the springs 36, 36, and the spring receivers 35, 35 through the pin 27 and the hydraulic servo mechanism 2.

Moreover, because the neutral position retaining mechanism 3 is structured so that the fixing portion 31a, having the same width as that of the pin 27 as a spool driving portion for driving the spool 22 of the hydraulic servo mechanism 2, is formed on the detent rod 31 and so that both the fixing portion 31a and pin 27 are sandwiched from opposite sides between the spring receivers 35, 35 biased by the springs 36 to retain the neutral position, it is possible to simplify and miniaturize the structure of the neutral position retaining mechanism 3 and it is easy to adjust the neutral position of the movable swash plate 10a. Furthermore, it becomes unnecessary to receive the biasing forces of the springs 36, 36 with additional members such as snap rings and it is also possible to prevent trouble such as coming off of the snap rings to thereby enhance durability and accuracy of retaining of the neutral position.

The neutral position retaining mechanism 3 is structured so that the torsion spring 28 and the like bias and support the pin 27 interlocked and coupled with the movable swash plate 10a through the hydraulic servo mechanism 2 to retain the neutral position of the movable swash plate 10a. The turning shaft 37 of the speed change operation lever 29 is engaged through the interlocked arm 39 and the torsion spring 28 with a midway portion of the pin 27 for sliding the spool 22 so that the pin 27 is operated integrally by turning of the speed change operation lever 29. The one end portion 27a of the pin 27 extending from one side of the engaged portion drives the spool 22 and the other end portion 27b of the pin 27 extending from the other side of the engaged portion is engaged with the detent rod 31 to carry out alignment of the neutral position.

The pin 27 is supported between a midway portion 27c and the one end portion 27a by a support arm 61 for turning. Because the midway portion of the pin 27 connecting the spool 22 and the neutral position retaining mechanism 3 by a straight line in the shortest distance is supported, it is possible to enhance the position accuracy for neutral retaining and accuracy of control of the spool 22 and to miniaturize the neutral position retaining mechanism 3 and the control mechanism of the spool 22.

Figure 2:
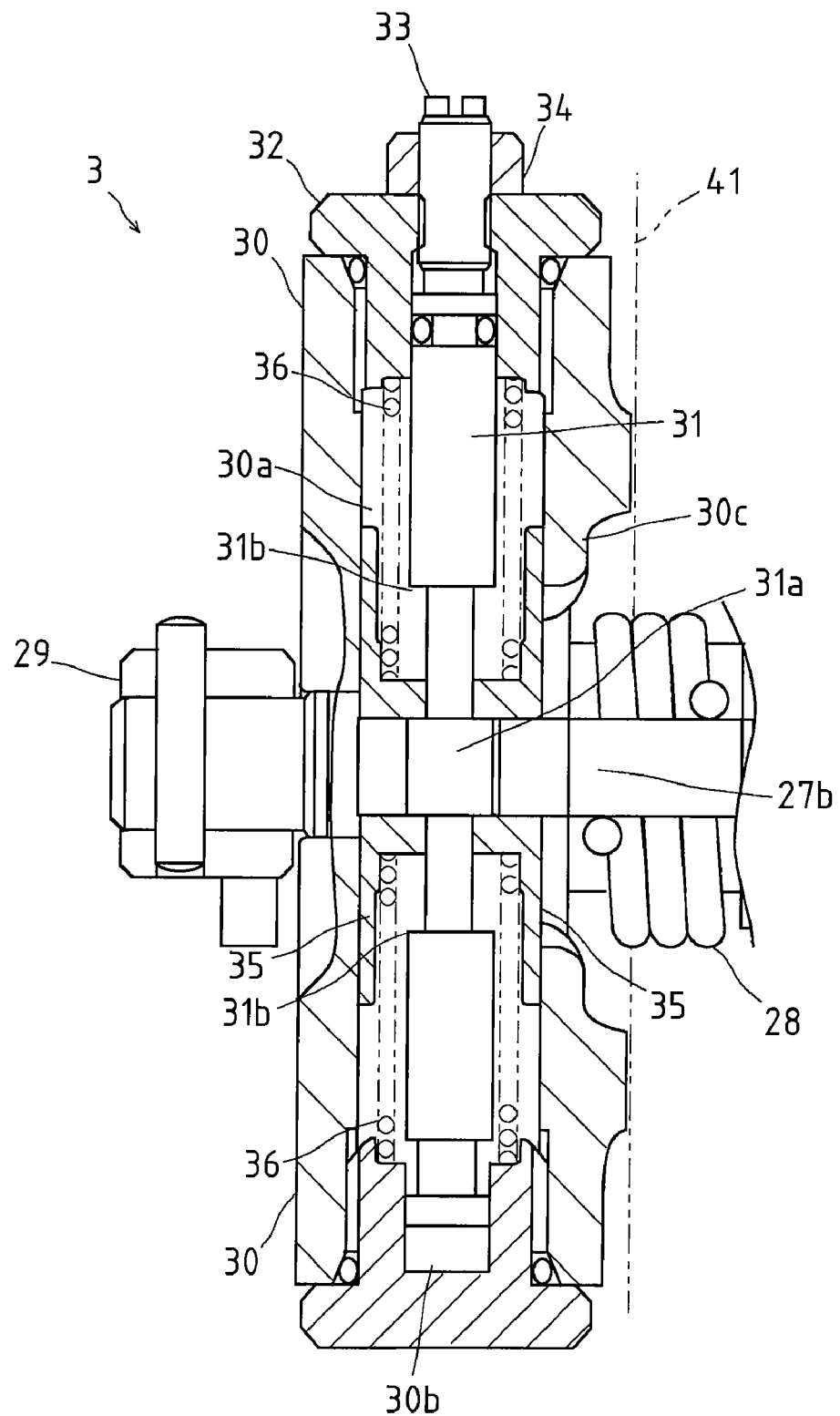
FIG. 2 is a front sectional view of a neutral position retaining mechanism.
Figure 3:
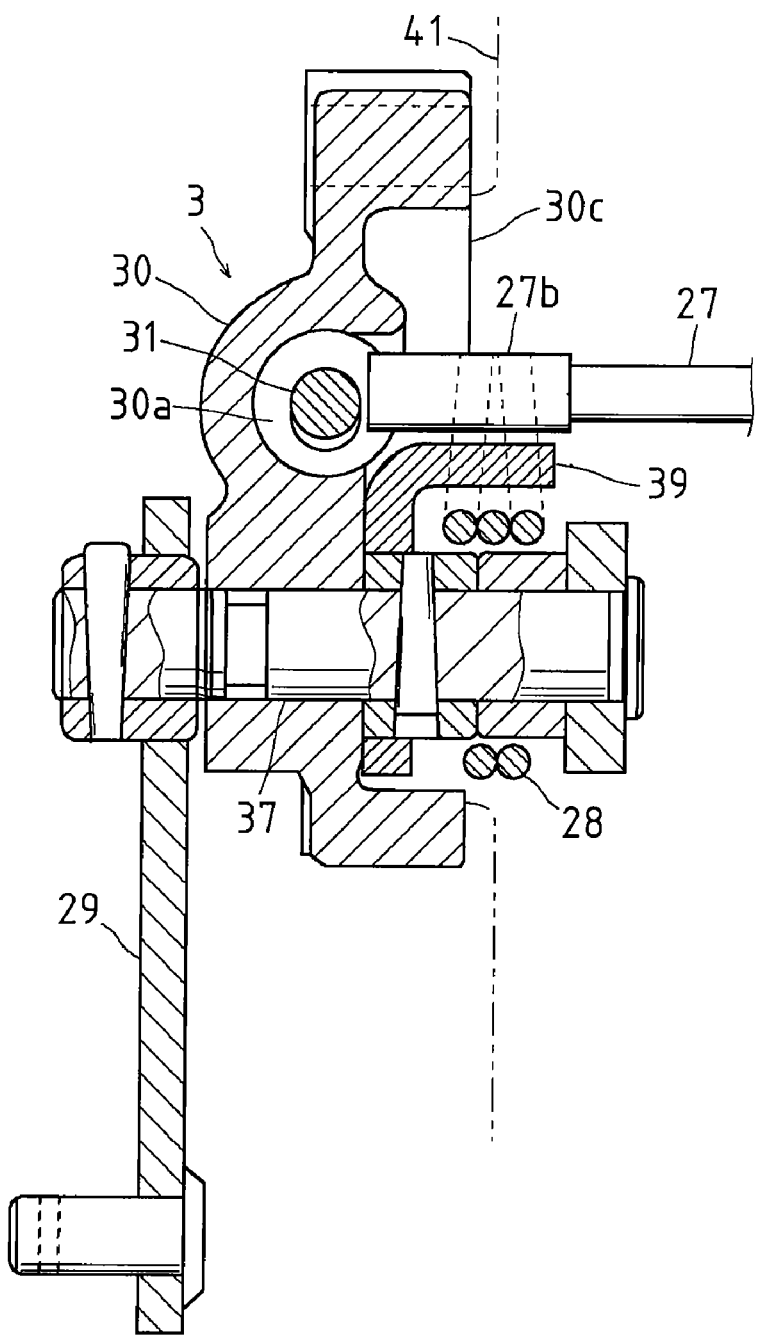
FIG. 3 is a plan sectional view of the same.
Figure 4:
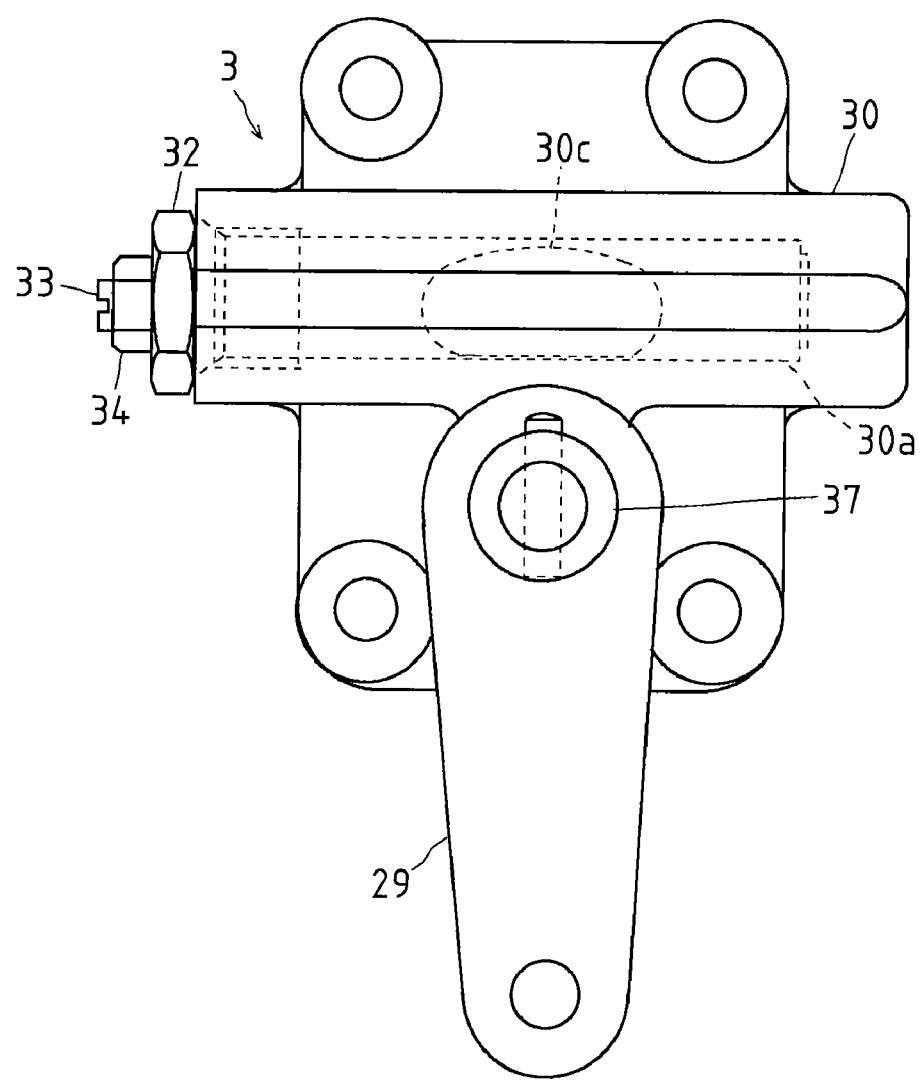
FIG. 4 is a view of one side of the same.
Figure 5:
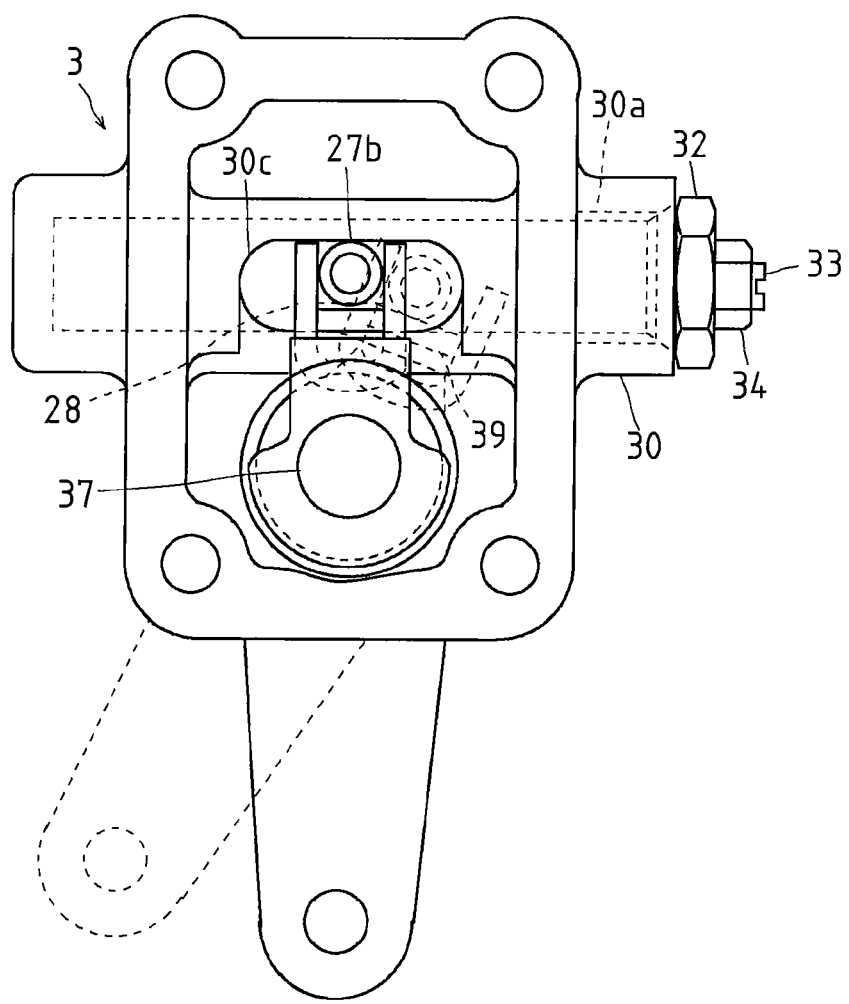
FIG. 5 is a view of the other side of the same.

Next, a neutral position adjusting mechanism of the neutral position retaining mechanism 3 will be described below. As shown in FIG. 2, the detent rod 31 can move toward the axial center by rotating the adjust bolt 33 screwed into the cap 32. Then, if the movable swash plate 10a is displaced from the neutral position in a state in which the pin 27 is retained at the position of the fixing portion 31a, the adjust bolt 33 is rotated to adjust the position of the fixing portion 31a of the detent rod 31 so that the movable swash plate 10a is positioned in the neutral position in the state in which the pin 27 is retained at the position of the fixing portion 31a.

As described above, the neutral position retaining mechanism 3 has an adjusting mechanism (neutral position adjusting mechanism) for finely adjusting the neutral position. Because the adjusting mechanism is structured so that the adjust bolt 33 protruding outside is rotated to thereby adjust neutral position of the movable swash plate 10a, operation is possible from outside without disassembling the neutral position retaining mechanism 3 and the adjusting operation of the neutral position becomes easy.

Because the detent rod 31 has an opposite-end-supported structure in which the opposite ends of the detent rod 31 are supported by the support recessed portion 30b and the cap 32, it is possible to enhance support strength of the detent rod 31 and to enhance accuracy of the neutral position retaining mechanism 3 and the like. If the detent rod 31 has a cantilever structure in which the detent rod 31 is supported by the cap 32 only, for example, machining of the support recessed portion 30b of the casing 30 becomes unnecessary and a wall thickness of the casing 30 can be reduced. As a result, it is possible to reduce manufacturing cost.

Next, a rotation restricting mechanism of the neutral position retaining mechanism 3 will be described below. As shown in FIGS. 2 to 5, the rotation restricting mechanism for restricting a maximum turning angle of the movable swash plate 10a is formed in the casing 30. In other words, the detent rod 31 is formed with step portions 31b, 31b on sides of opposite ends of the fixing portion 31a and the spring receivers 35, 35 for sliding toward the axial center of the detent rod 31 are locked to the step portions 31b, 31b. If the pin 27 is turned by turning operation of the speed change operation lever 29, the spring receiver 35 in a direction in which the pin 27 is turned slides toward the end portion side of the detent rod 31 together with the pin 27 against the biasing force of the spring 36. When the spring receiver 35 slides a certain distance, the spring receiver 35 is locked to the step portion 31b and the spring receiver 35 and the pin 27 cannot move any more toward the end portion side.

As described above, the neutral position retaining mechanism 3 is structured to restrict the turning amount of the pin 27 with the step portions 31b formed on the detent rod 31 to thereby restrict the maximum turning angle of the movable swash plate 10a. Therefore, it is possible to accurately set the maximum turning angle from the neutral position of the movable swash plate 10a and to enhance durability to maintain high accuracy for a long term. Moreover, adjustment of strokes of the detent rod 31 between the fixing portion 31a and the step portions 31b, 31b are determined by mechanical machining accuracy in machining the detent rod 31. In this way, it is unnecessary to carry out adjustment of the rotation restricting mechanism after the detent rod 31 has been mounted into the casing 30 and it is possible to omit an adjustment step at the time of shipment, for example.

Next, an overstroke mechanism in the neutral position retaining mechanism 3 will be described below. As shown in FIGS. 2 to 5, the overstroke mechanism is formed in the casing 30 for accommodating the turning operation of the speed change operation lever 29 when the speed change operation lever 29 is turned more than the turning amount of the pin 27 restricted by the rotation restricting mechanism. As described above, the pin 27 is turned together through the interlocked arm 39 and the torsion spring 28 by turning operation of the speed change operation lever 29. If the pin 27 is turned by a certain amount and cannot be turned any more with its turning restricted by the rotation restricting mechanism, the interlocked arm 39 which is pinched by the torsion spring 28 and is turned together with the speed change operation lever 29 turns against the biasing force of the torsion spring 28 while expanding the spring 28.

As described above, the overstroke mechanism is structured so that, after the turning of the pin 27 is restricted by the rotation restricting mechanism, only the interlocked arm 39 turns while expanding the torsion spring 28 to prevent force of turning operation of the speed change operation lever 29 from directly acting on the pin 27. With this structure, even when the speed change operation lever 29 is turned excessively, it is possible to avoid straining of the pin 27, the spring receivers 35, 35, the detent rod 31, and the like, to prevent damage to these members and the hydraulic servo mechanism 2, and to prevent the neutral position retaining mechanism 3 from moving out of adjustment.

The casing 30, in which the neutral position retaining mechanism 3 and the like structured as described above are mounted, is mounted to the housing 12 of the HST 1 through the cylinder 41 of the load control mechanism 4 which will be described later. Therefore, the neutral position retaining mechanism 3 mounted in the casing 30, the rotation restricting mechanism, and the overstroke mechanism disposed on the side of the casing 30 to be mounted to the housing 12 can be enclosed in the housing 12 and the casing 30 by mounting the casing 30 to the housing 12 through the cylinder 41 of the load control mechanism 4. Therefore, foreign matter such as dirt and trash does not adhere to component members of the respective mechanisms thereby preventing the mechanisms from malfunctioning and from moving out of respective adjustments due to impacts from outside. Moreover, it is possible to miniaturize the respective mechanisms and to reduce the cost.

Furthermore, in the HST 1 according to the embodiment, the fixing portion 31a can be formed integrally not only with the detent rod 31 but also with the casing 30, thereby reducing the cost. It is also possible that the fixing portion 31a is formed separately and mounted to the detent rod 31 or the casing 30. Because the spring receivers 35, 35 for sandwiching the pin 27 and the fixing portion 31a from opposite sides are guided at their outer peripheral portions by the casing 30 formed of firm block materials, the spring receivers 35, 35 can accurately carry out alignment of the pin 27.

The maximum swash plate position retaining mechanism 103 is formed on the hydraulic motor 11 side (see FIG. 1). The maximum swash plate position retaining mechanism 103 always retains the movable swash plate 11a of the hydraulic motor 11 in the maximum swash plate position. The maximum swash plate position retaining mechanism 103 is formed substantially similarly to the neutral position retaining mechanism 3. In the maximum swash plate position retaining mechanism 103, a zero-degree position adjusting mechanism is formed. If the movable swash plate 11a is displaced from a zero-degree position, the adjust bolt 33 can be rotated to carry out adjustment so that the movable swash plate 11a is positioned in the zero-degree position.

Figure 6:
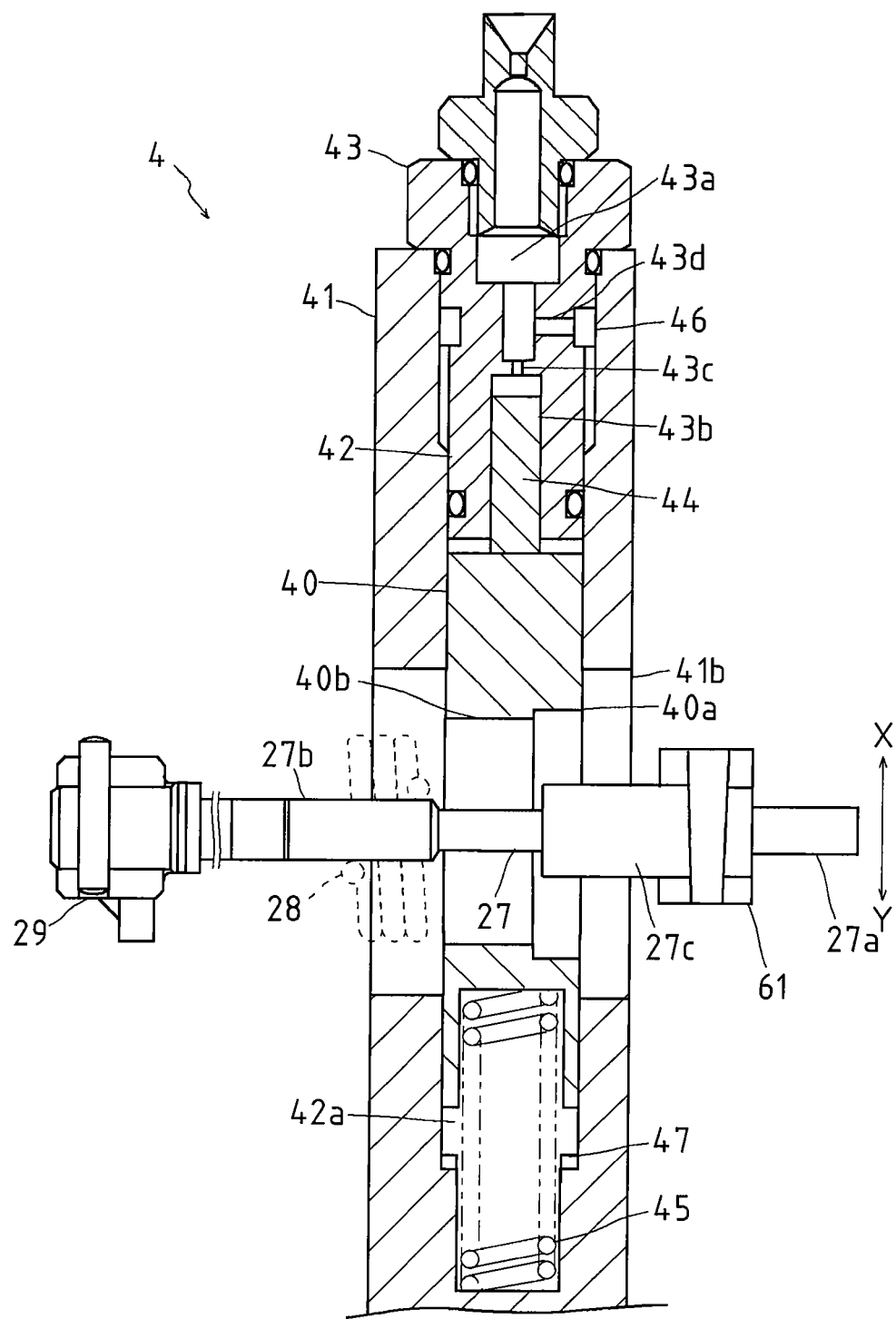
FIG. 6 is a front sectional view of a load control mechanism for a hydraulic pump.

Next, structures of the load control mechanisms 4, 104 will be described below. As shown in FIGS. 1 and 6, in the load control mechanism 4 in the embodiment, the spool 40 is slidably inserted into the cylinder 41 and is pushed by the pressurized oil supplied from the main oil path 13 of the HST 1 into the cylinder 41 to carry out control of the swash plate angle of the movable swash plate 10a of the hydraulic pump 10 independently of the control of the movable swash plate 10a by the hydraulic servo mechanism 2 and the like. The load control mechanism 4 is formed of the cylinder 41, the spool 40, and the like, and the cylinder 41 is disposed on one side of the housing 12 of the HST 1 and positioned between the hydraulic servo mechanism 2 and the neutral position retaining mechanism 3.

The cylinder 41 is formed to be long along a substantially flat side wall face of the housing 12 of the HST 1, a cylinder hole 42 is formed in the cylinder 41 to open at an upper portion of the cylinder 41, and the substantially circular cylindrical spool 40 is slidably inserted in the cylinder hole 42. A pipe joint portion 43 connected to the main oil path 13 of the HST 1 through a supply/discharge oil path 14 is screwed into an open end of the cylinder hole 42 and the pressurized oil in the main oil path 13 is supplied into and discharged from the cylinder 41 through the supply/discharge oil path 14 (pipe joint portion 43). An opening portion 41b open in a lateral direction is formed to penetrate a vertical midway portion of the cylinder 41.

With reference to the hydraulic circuit diagram shown in FIG. 7, a hydraulic pump (charge pump) 50 for supplying the hydraulic oil to the main oil path 13 is driven by the engine 15 through a pump shaft 51 and draws in the oil from an oil tank 52. An oil path 53 is connected to a discharge port of the hydraulic pump 50, and the oil path 53 is connected to the main oil path 13 provided in the HST 1 through relief valves 54, 54 having check valves 54a, 54a. At a midway portion of the oil path 53, a regulating valve 55 is disposed. The main oil path 13 forms a closed circuit between the hydraulic pump 10 and the hydraulic motor 11, and the supply/discharge oil path 14 is connected to the oil path on the high-pressure side when the hydraulic motor 11 is rotated forward. In this way, the oil from the hydraulic pump 50 is supplied to the main oil path 13 when hydraulic pressure in the low-pressure-side oil path becomes lower than the hydraulic pressure specified by the regulating valve 55 through the oil path 53. When the hydraulic pressure is higher, the oil is drained by the regulating valve 55 into an oil reservoir 56 in the housing 12 of the HST 1 to thereby regulate a flow rate of the oil to be supplied to the main oil path 13.

Driving from the engine 15 is transmitted from the hydraulic pump 50 to the variable displacement-type hydraulic pump 10 through the drive shaft 57, and the cylinder block and the like are driven for rotation by this driving force. The hydraulic pump 10 is fluidically connected to the likewise variable displacement-type hydraulic motor 11 through the main oil path 13, and pressurized oil discharged from the hydraulic pump 10 is supplied to and discharged from the hydraulic motor 11. The swash plate angle of the movable swash plate 10a of the hydraulic pump 10 is controlled by the hydraulic servo mechanism 2, the neutral position retaining mechanism 3, the load control mechanism 4, and the like as described above. Pressurized oil is supplied and discharged to and from the hydraulic servo mechanism 2 and the like, from and to the main oil path 13 via an oil path 58, and eventually discharged to the oil reservoir 56 in the HST 1. Pressurized oil is supplied and discharged to and from the load control mechanism 4 and, from and to the main oil path 13 via the supply/discharge oil path 14, and the spool 40 inserted into the cylinder 41 is slid by the pressurized oil.

As a means for controlling tilting of the movable swash plate 11a of the hydraulic motor 11, the hydraulic servo mechanism 2, the load control mechanism 104, and the like are connected similarly to the hydraulic pump 10. The hydraulic motor 11 is fluidically connected to the hydraulic pump 10 through the main oil path 13, and pressurized oil discharged from the hydraulic pump 10 drives the cylinder block and the like for rotation, to drive the output shaft 59 for rotation. The rotary driving of the output shaft 59 is transmitted to a travel shaft (not shown) for driving an axle, a drive shaft for driving the work machine, and the like. A structure and the like of the hydraulic motor 11 will be described later.

First, a structure of the load control mechanism 4 for the hydraulic pump 10 will be specifically described below. As shown in FIG. 6, the pipe joint portion 43 is screwed into the cylinder hole 42 in oil-tight close contact with an inner face of the cylinder hole 42. An oil supply/discharge port 43a is formed in the pipe joint portion 43 and the pressurized oil is led from the main oil path 13 of the HST 1 to the oil supply/discharge port 43a via the supply/discharge oil path 14 so that the hydraulic pressure can be detected. The pipe joint portion 43 is formed with a pin hole 43b that is open on an inner face side of the cylinder hole 42, a pin 44 is slidably inserted into the pin hole 43b while being in close contact with an inner wall of the pin hole 43b, and one end portion of the pin 44 is in contact with a side face of the spool 40. The pin hole 43b is connected to the oil supply/discharge port 43a provided in the pipe joint portion 43 through an orifice 43c. The pressurized oil in the oil supply/discharge port 43a is filled in the pin hole 43b through the orifice 43c, and the pin 44 is slid according to the hydraulic pressure in the main oil path 13. For example, if hydraulic pressure in the main oil path 13 becomes high, the pin 44 is pushed out of the pin hole 43b. If the pin 44 is pushed out of the pin hole 43b, the spool 40 is pressed by the pin 44 and slid downward.

A through hole 40b in a shape of an elongated hole is formed to penetrate a substantially central portion in a longitudinal direction of the spool 40, and the one end portion 27a of the pin 27 is inserted into the through hole 40b. The through hole 40b communicates with the opening portion 41b of the cylinder 41 in a state in which the spool 40 is inserted into the cylinder hole 42 of the cylinder 41. Because the cylinder 41 is interposed between the housing 12 and the casing 30, one side of the cylinder 41 communicates with the openings 12a, 21a which are open in side faces of the housing 12 and the piston 21, and the other side of the cylinder 41 communicates with an opening portion 30c that is open in the side face of the casing 30. The pin 27 penetrates the load control mechanism 4 (the cylinder 41, the spool 40, and the like) in a width direction through the through hole 40b and the like.

The spool 40 is formed at an opening edge portion of the through hole 40b with a notch portion 40a, and the notch portion 40a is in contact with the midway portion 27c of the pin 27. The midway portion 27c is formed to be larger than the pin 27 in a radial direction. Because the opening of the through hole 40b of the spool 40 is larger than a shaft radius of the pin 27, the pin 27 does not come in contact with a side wall of the through hole 40b even if the pin 27 moves substantially parallel along the longitudinal direction of the cylinder 41, but the notch portion 40a comes in contact with the midway portion 27c of the pin 27, and the spool 40 and the pin 27 slide together.

Figure 8:
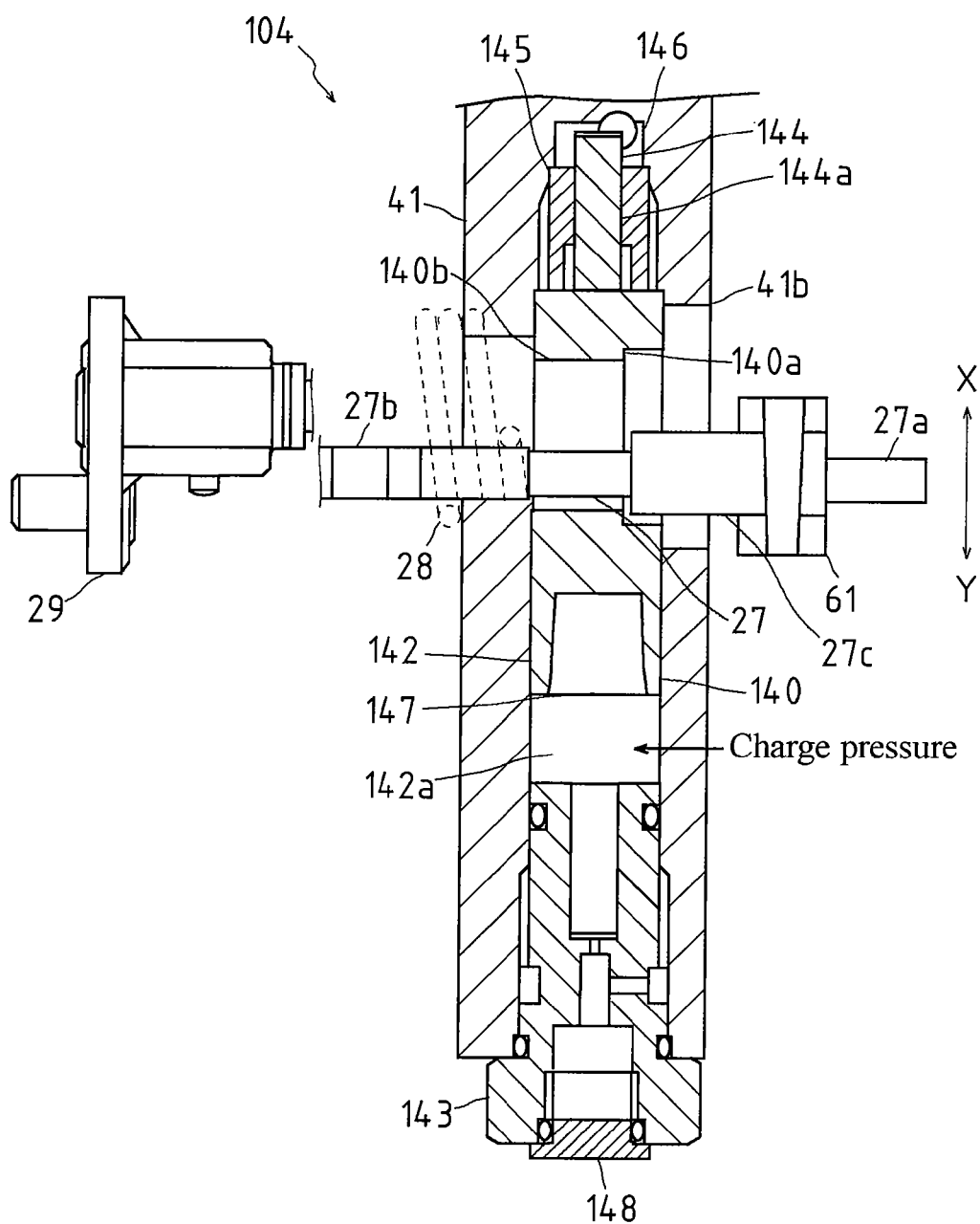
FIG. 8 is a front sectional view of a load control mechanism for a hydraulic motor.

Next, a structure of the load control mechanism 104 for the hydraulic motor 11 will be described below. As shown in FIGS. 1 and 8, the hydraulic servo mechanism 2, the maximum swash plate position retaining mechanism 103, and the like for the hydraulic motor 11 are formed substantially in the same way as the hydraulic servo mechanism 2 and the maximum swash plate position retaining mechanism 103 for the hydraulic pump 10. The hydraulic motor 11 in the embodiment is of a variable displacement type, a swash plate angle of the movable swash plate 11a is controlled by the hydraulic servo mechanism 2, and the pin 27 interlocked and coupled with the movable swash plate 11a through the hydraulic servo mechanism 2 is supported by the torsion spring 28 and the like to retain the maximum swash plate position of the movable swash plate 11a (maximum swash plate position retaining mechanism 103).

The load control mechanism 104 for the hydraulic motor 11 is disposed in the cylinder 41. Especially in the cylinder 41 in the embodiment, the load control mechanism 4 for the hydraulic pump 10 and the load control mechanism 104 for the hydraulic motor 11 respectively corresponding to the hydraulic pump 10 and the hydraulic motor 11 disposed side by side in the housing 12 are integrally provided. In other words, the cylinder 41 is provided with the spool 40 and the like forming the load control mechanism 4 for the hydraulic pump 10 and is integrally provided with the spool 140 and the like forming the load control mechanism 104 for the hydraulic motor 11.

By integrally providing the load control mechanisms 4, 104 with the side wall of the HST 1, it is possible to attach or detach the respective load control mechanisms 4, 104 at a time by attaching or detaching the cylinder 41, which makes maintenance of the load control mechanisms 4, 104 easy and improves workability. Moreover, because the respective load control mechanisms 4, 104 are formed substantially in the same way, it is possible to reduce the number of kinds of parts and to simplify a manufacturing process. However, only the load control mechanism 4 for the hydraulic pump 10 or only the load control mechanism 104 for the hydraulic motor 11 may be disposed alone as the load control mechanism. This case is also preferable because control of the respective movable swash plates becomes easy as will be described later.

A cylinder hole 142 that is open at a lower portion of the cylinder 41 is formed in a vertical direction in the load control mechanism 104. A pipe joint portion 143 is fitted in the open end portion and is connected to a discharge side of the hydraulic pump 50 through a joint 148 and piping (oil path 18). In the cylinder hole 142, a substantially circular cylindrical spool 140 is inserted slidably. In a state in which the spool 40 is inserted in the cylinder hole 142, an inner cylinder 145 is fixed to a back portion of the cylinder hole 142 so that the inner cylinder 145 cannot move with respect to the cylinder hole 142. A pin hole 144a is formed in the inner cylinder 145, a pin 144 is inserted into the pin hole 144a while being in close contact with an inner wall of the pin hole 144a, and one end portion of the pin 144 is in contact with a lower face of the spool 140.

The pin hole 144a is formed with an oil reservoir 146 between the pin hole 144a and the other end portion of the pin 144, and the main oil path 13 communicates with the oil reservoir 146. However, the cylinder 41 is shared in the embodiment, and therefore the main oil path 13 communicates with the oil reservoir 146 via the load control mechanism 4 for the hydraulic pump 10 (see FIG. 7). In other words, in the load control mechanism 4, an oil reservoir 46 is formed between an outer peripheral face of the pipe joint portion 43 and an inner peripheral face of the cylinder hole 42 and is connected to the oil supply/discharge port 43a via a supply/discharge pipe 17 connected to the oil reservoir 146 and an oil hole 43d.

A through hole 140b in a shape of an elongated hole is formed to penetrate a substantially central portion in a longitudinal direction of the spool 140. The through hole 40b communicates with the opening portion 41b formed to laterally penetrate the cylinder 41 in a state in which the spool 140 is inserted into the cylinder hole 142. As described above, because the cylinder 41 is interposed between the housing 12 and the casing 30, the pin 27 interlocked and coupled with the movable swash plate 11a of the hydraulic motor 11 through the hydraulic servo mechanism 2 penetrates the load control mechanism 104 (the cylinder 41, the spool 140, and the like) in a width direction through the through hole 140b and the like.

The spool 140 is formed at an opening edge portion of the through hole 140b with a notch portion 140a, and the notch portion 140a is in contact with the midway portion 27c of the pin 27. A normal position of the load control mechanism 104 for the hydraulic motor 11 is a position in which the midway portion 27c is in contact with the notch portion 140a in a state in which the movable swash plate 11a is tilted through the maximum swash plate angle. With this structure, the load control mechanism 104 can control tilting of the movable swash plate 11a of the hydraulic motor 11 in such a direction as to reduce the swash plate angle of the movable swash plate 11a and can control torque by controlling the swash plate angle. This will be described later in detail.

In the HST 1 structured as described above, when the load torque arises in the engine 15, the load control mechanisms 4, 104 carry out control of the swash plate angles of the movable swash plates 10a, 11a of the hydraulic pump 10 and the hydraulic motor 11 of the HST independently of the control by the speed change operation lever 29, to thereby prevent stalling of the engine 15.

Next, control by the load control mechanisms 4, 104 will be described below. The load control mechanism 4 for the hydraulic pump 10 is formed of the cylinder 41 to and from which the pressurized oil in the main oil path 13 is supplied and discharged and the spool 40 slidably inserted into the cylinder 41 and engaged with the pin 27 as described above. The spool 40 pressed through the pin 44 by the rise of the pressurized oil in the cylinder 41 (oil supply/discharge port 43a) due to the load is engaged with and moves the pin 27 against the biasing force of the torsion spring 28, to thereby control the swash plate angle of the movable swash plate 10a independently of the tilting operation by the above-described hydraulic servo mechanism 2 and the like.

With reference to FIGS. 9(a) to 9(c), the pin 44 is aligned in a state in which the pin 44 is pushed into the pin hole 43b by a biasing force of a spring 45 through the spool 40 (see FIG. 9(a)). In causing to travel the work vehicle mounted with the HST 1, if the speed change operation lever 29 is turned through a linkage (not shown), the pin 27 is moved integrally with the speed change operation lever 29, the pin 27 moves substantially parallel in the opening portion 41b of the cylinder 41 and the through hole 40b of the spool 40, the spool 22 of the hydraulic servo mechanism 2 is slid in synchronization with the pin 27, the oil path is switched by sliding of the spool 22 to slide the piston 21, and the movable swash plate 10a of the hydraulic pump 10 engaged with the piston 21 is tilted (see FIG. 9(b)). In the embodiment, if the speed change operation lever 29 is turned so as to cause the stopped work vehicle to travel forward, the pin 27 is moved upward, and the movable swash plate 10a is gradually tilted in synchronization with this movement to carry out control for increasing the swash plate angle. The tilting operation of the movable swash plate 10a is controlled by the hydraulic servo mechanism 2, the neutral position retaining mechanism 3, and the like.

If the load is applied on the traveling portion in this state, the hydraulic pressure on the high-pressure (forward) side of the main oil path 13 in the HST 1 increases, i.e., the hydraulic pressure in the oil supply/discharge port 43a increases. When the pin 44 receives this pressurized oil, the pin 44 presses the spool 40 downward, and the notch portion 40a of the spool 40 comes in contact with the midway portion 27c and slides the spool 40 downward against the biasing force of the torsion spring 28 for pinching the pin 27, the spring 45, and charge pressure (see FIG. 9(c)). On the other hand, if the load reduces to reduce the hydraulic pressure in the main oil path 13 and to reduce the hydraulic pressure in the oil supply/discharge port 43a, the biasing force of the torsion spring 28 tries to return the pin 27 to the position set by the speed change operation lever 29, and the pin 44 slides the spool 40 upward so as to push the spool 40 into the pin hole 43b due to the spring 45 and the charge pressure to thereby carry out control for increasing the swash plate angle of the movable swash plate 10a. Then, the movable swash plate 10a of the hydraulic pump 10 is aligned again with a predetermined position by the speed change operation lever 29 and the like.

In other words, during normal traveling of the work vehicle, the output rotational speed of the HST 1 is increased or reduced by the turning operation of the speed change operation lever 29. In carrying out the loader work with the work machine at a low speed, large traction is required, and therefore the load torque is applied on the output shaft 59 (axle). The load is also applied on the engine 15 and causes stalling if the load exceeds the engine horsepower. In order to prevent stalling, the spool in the cylinder 41 is slid when it receives the pressurized oil in the main oil path 13 when the hydraulic pressure increases in the main oil path 13, to thereby carry out control for reducing the swash plate angle of the movable swash plate 10a of the hydraulic pump 10. In other words, by carrying out the control for reducing the swash plate angle of the movable swash plate 10a of the hydraulic pump 10 to reduce the discharge amount of the pressurized oil from the hydraulic pump 10 to reduce the vehicle speed, stalling of the engine 15 is prevented.

As shown in FIG. 10, a relationship of the traction (kg·f) to the vehicle speed (km/h) of the engine 15 is expressed by an engine horsepower curve A. In the work vehicle, the driving force for driving the work machine is required in addition to the driving force for the axle. Therefore, during traveling H when the traction is unnecessary, high-speed traveling is possible. During loader plunging M, medium-speed torque is generated to generate traction for plunging into the ground the loader work machine provided to the work vehicle. During loader work L, the traction for driving the loader work machine to carry out the work is required, and therefore it is possible to generate greater low-speed torque.

The work vehicle mounted with such an engine 15 stalls when the load exceeding the predetermined traction corresponding to the engine horsepower curve A is applied. Therefore, conventionally, vehicle speed is reduced by a speed changing device or the like to thereby increase the traction (increase torque) by manual operation, or a high-horsepower engine is mounted to the work vehicle in advance to prevent stalling. For example, the engine 15 stalls if the load exceeding the traction corresponding to the predetermined vehicle speed is applied on the engine 15 during use of the work machine or traveling on an upward slope. Therefore, an operator or the like needs to operate a speed change lever, an accelerator pedal, or the like to adjust the vehicle speed of the work vehicle to a medium speed or a low speed.

In the embodiment, the load control mechanism 4 structured as described above can automatically control the swash plate angle of the movable swash plate 10a of the hydraulic pump 10 to effectively prevent stalling. Especially in the HST 1 according to the embodiment, the load control mechanism 4 is formed of the cylinder 41 and the spool 40, and the spool 40 is slid according to the hydraulic pressure in the main oil path 13 and is engaged with the pin 27 to move the pin against the biasing force of the torsion spring 28. Therefore, it is possible to accurately control the movable swash plate 10a. Moreover, without carrying out the tilting operation by the speed change operation lever 29, the movable swash plate 10a is automatically tilted to prevent stalling when the load is applied. Therefore, operation during traveling operation becomes easy.

The load control mechanism 104 of the hydraulic motor 11 is also structured to automatically tilt the movable swash plate 11a of the hydraulic motor 11 to control the swash plate angle of the movable swash plate 11a similarly to the load control mechanism 4. However, in the hydraulic motor 11, the swash plate angle of the movable swash plate 11a is adjusted to the maximum at a standstill (maximum swash plate position retaining mechanism 103) and the swash plate angle is controlled to reduce as the work vehicle travels. In the load control mechanism 104, if the speed change operation lever 29 is operated, the pin 27 moved integrally with the lever 29 is aligned in a predetermined state by the torsion spring 28. In this state, if the load is applied on the engine 15 to increase the hydraulic pressure in the main oil path 13 in the HST 1 to increase the hydraulic pressure in the oil reservoir 146 through the supply/discharge pipe 17, the pin 144 presses the spool 140 downward when it receives the pressurized oil, and the notch portion 140a of the spool 140 comes in contact with the midway portion 27c and slides the portion 27c downward against the biasing force of the torsion spring 28 and the charge pressure. In other words, the load control mechanism 104 for the hydraulic motor 11 is structured to carry out control for increasing the swash plate angle of the movable swash plate 11a of the hydraulic motor 11 so as to reduce the vehicle speed when the hydraulic pressure in the main oil path 13 increases, similarly to the load control mechanism 4 for the hydraulic pump 10.

As shown in FIG. 11, the HST 1 according to the embodiment is provided with such load control mechanisms 4, 104 and is structured to control the swash plate angles of the movable swash plates 10a, 11a of the hydraulic pump 10 and the hydraulic motor 11, that is, carry out load control so that a curve B expressing a relationship of the traction to the vehicle speed of the HST 1 does not exceed the engine horsepower curve A of the engine 15 shown by a dashed line.

The load control mechanisms 4, 104 mainly control the swash plate angle of the movable swash plate 10a of the hydraulic pump 10 in a vehicle speed range a, that is, a low-speed region in FIG. 11 and control the swash plate angle of the movable swash plate 11a of the hydraulic motor 11 in a vehicle speed range b, that is, a medium/high-speed region. In the vehicle speed range a, the movable swash plate 10a of the hydraulic pump 10 can tilt freely while the movable swash plate 11a of the hydraulic motor 11 is fixed in a position of the maximum swash plate angle. Then, if the vehicle speed enters the vehicle speed range b from the maximum value in the vehicle speed range a, the swash plate angle of the movable swash plate 10a of the hydraulic pump 10 becomes the maximum and the movable swash plate 10a of the hydraulic pump 10 is fixed in the position substantially simultaneously, and the movable swash plate 11a of the hydraulic motor 11 is tilted in such a direction that the swash plate angle of the movable swash plate 11a reduces. In the embodiment, a switch between the control by the hydraulic pump 10 and the control by the hydraulic motor 11 is made according to the vehicle speed ranges a, b to thereby efficiently carry out control in a wide speed range.

In the vehicle speed range a, the load control mechanism 4 mainly controls the swash plate angle of the movable swash plate 10a of the hydraulic pump 10. In the vehicle speed range a, the loader work machine is used in the work vehicle in the embodiment. Therefore, in order to efficiently control the swash plate angle of the movable swash plate 10a of the hydraulic pump 10, the load control mechanism 4 is structured so that one end side of the spool 40 is biased by an elastic member inserted into the cylinder 41 to make fluctuation of the swash plate angle of the movable swash plate 10a of the hydraulic pump 10 inversely proportional to fluctuation of the hydraulic pressure in the main oil path 13.

To put it concretely, as shown in FIG. 6, in a state in which the spool 40 is inserted in the cylinder hole 42, a space 42a is formed between the end portion of the spool 40 and the cylinder hole 42 at the other end of the cylinder hole 42, and the spring 45 as the elastic member is disposed in the space 42a. The spring 45 comes in contact with the lower face of the spool 40 to bias the spool 40 in an opposite direction to the pressing direction by the pin 44. Therefore, in a state in which the movable swash plate 10a of the hydraulic pump 10 is retained in the neutral position, the spool 40 is biased by the biasing force of the spring 45 in such a direction as to push the pin 44 into the pin hole 43b (upward in FIG. 6). Moreover, the space 42a communicates with the discharge-side oil path 53 of the hydraulic pump 50 via the oil path 18 so that the charge pressure of the HST acts as back pressure.

Thus, during operation while traveling at low speed, if the traveling load increases to increase the pressure in the main oil path 13 and the force of the pin 44 for pressing the spool 40 exceeds the biasing force of the spring 45 and the charge pressure of the HST when the pin 44 receives the pressurized oil in the oil supply/discharge port 43a, the spool 40 is slid downward at last and the pin 27 is moved simultaneously to tilt the movable swash plate 10a toward the low-speed side and traction increases due to the deceleration. At this time, even if the speed change pedal or the speed change lever is turned toward the speed increase side, the interlocked arm 39 merely turns the torsion spring 28, and the movable swash plate 10a is not tilted and excessive load that causes the stalling is prevented. When the load reduces and the force obtained by adding the biasing force of the spring 45 and the charge pressure of the HST exceeds the force of the pin 44 for pressing the spool 40, the spool 40 is slid upward to push the pin 44 into the pin hole 43b and returns to the position (set speed) set by the speed change pedal.

The spool 40 for sliding when it receives the pressurized oil in the main oil path 13 is biased by the elastic member (spring 45) and the charge pressure to thereby carry out the control for making the swash plate angle of the movable swash plate 10a of the hydraulic pump 10 inversely proportional to the fluctuation of the hydraulic pressure in the main oil path 13. For example, the control is carried out so that the vehicle speed reduces in proportion to the pressurized oil in the main oil path 13 when the pressurized oil increases. With this control, when the traction is required, for example, when the loader work machine is used during low-speed traveling, the swash plate angle is controlled accurately and effectively by the load control mechanism 4, to thereby increase the low-speed torque to effectively prevent the above-described stalling. By using the charge pressure as the back pressure, the spring 45 as the elastic member for biasing the spool 40 can be downsized to thereby miniaturize the load control mechanism 4 formed of the cylinder 41 and the like and reduce the number of parts.

The load control mechanism 4 carries out control so that the lowest speed in the vehicle speed range a does not become equal to or lower than a certain speed (lowest speed c). As shown in FIG. 6, in the space 42a, an inner wall of the cylinder hole 42 is formed with a stopper portion 47 protruding toward an axial center of the cylinder hole 42 formed in a substantially circular cylindrical shape. The stopper portion 47 is formed to reduce a radius of a portion which is an end portion of the space 42a and in which the spring 45 is disposed, from a radius of the cylinder hole 42 to form a step portion. The lower face of the spool 40 comes in contact with an upper face of the stopper portion 47 to restrict a position to which the spool 40 slides downward. The spool 40 slid downward by the pin 44 when it receives the pressurized oil in the main oil path 13 comes in contact with the stopper portion 47, and then the downward sliding of the spool 40 is stopped. However, a configuration of the stopper portion 47 is not limited to the step portion. It is also possible to insert a pin in a direction perpendicular to an axis or to screw a cylindrical screw into an opposite side to the spool 40 to form the stopper portion 47, a position of which is adjustable.

As described above, in the load control mechanism 4, when the spool 40 slides downward, the spool 40 is engaged with the pin 27 and moves the pin 27, to thereby control the movable swash plate 10a of the hydraulic pump 10 so as to reduce the swash plate angle. By restricting the position to which the spool 40 slides downward with the stopper portion 47, the movable swash plate 10a is not tilted any more, in other words, the swash plate angle does not reduce any more and therefore the output torque from the hydraulic pump 10 becomes constant to maintain the lowest speed c. The lowest speed c is in a region lower than the engine horsepower curve A in FIG. 11 and is in such a range that stalling does not occur. By carrying out the control for maintaining the lowest speed c in the load control mechanism 4, the vehicle speed is not reduced more than necessary and it is possible to efficiently carry out the work by the work machine while securing the traction for carrying out the work.

Moreover, the load control mechanism 4 carries out control so that the traction of the HST 1 during low-speed traveling in the vehicle speed range a becomes about half of the traction of the engine horsepower (see the engine horsepower curve A in FIG. 11). In the vehicle speed range a, the loader work is mainly carried out and therefore the traveling load is large and the load applied on the engine 15 is also large. Therefore, by carrying out the control so that the traction during low-speed traveling becomes about half of the traction of the engine 15 (engine horsepower), it is possible to provide a margin with respect to the engine horsepower in advance. Thus, even if the operation that increases the load torque is carried out in addition to the traveling, it is possible to reliably prevent stalling.

In the vehicle speed range b in FIG. 11, the load control mechanism 104 mainly controls the swash plate angle of the movable swash plate 11a of the hydraulic motor 11. To put it concretely, in the vehicle speed range b, the load control mechanism 104 carries out the control for applying the charge pressure on one end side of the spool 140 in the cylinder 41 and sliding the spool 140 with the hydraulic pressure in the main oil path 13 to turn the movable swash plate 11a of the hydraulic motor 11 toward the speed reduction side when the load becomes excessive. With this structure, the work machine or the like is not used during traveling of the work vehicle on a road or the like at high speed and therefore the large load is not applied on the engine 15 and it is possible to carry out control so that the curve B approximates the engine horsepower curve A to thereby efficiently output driving of the engine 15.

To put it concretely, as shown in FIG. 8, in the load control mechanism 104, a space 142a is formed between the spool 140 and the pipe joint portion 143, and the charge pressure (pressurized oil) is supplied into the space 142a from the oil path 18 that branches off from the oil path 53 on the discharge side of the hydraulic pump 50. This charge pressure presses spool 140 in a direction (direction X) opposite to a direction in which the pin 144 presses the spool 140. The spool 140 is pressed by the charge pressure in such a direction as to push the pin 144 into the pin hole 144a. If the pin 144 presses the spool 140 and the pressing force exceeds the charge pressure, the pin 144 slides the spool 40 downward. If the load reduces and the charge pressure exceeds the force of the pin 144 for pressing the spool 140, the spool 140 is pressed and slid upward and the pin 144 is pushed into the pin hole 144a.

In this manner, in the vehicle speed range a, only the hydraulic pump 10 is operated, and the hydraulic motor 11 is not operated and retained on the low-speed side. In the high-speed range in the vehicle speed range b, the hydraulic pump 10 is retained on the high-speed side and only the hydraulic motor 11 is operated. In order to increase the speed, the midway portion 27c is turned from the low-speed side to the high-speed side, that is, in the direction X. In the vehicle speed range b, the swash plate angle of the movable swash plate 11a of the hydraulic motor 11 is controlled so that the hydraulic pressure in the main oil path 13 becomes constant. The load control mechanism 104 in the vehicle speed range b slides the spool 140 in a direction Y through the pin 144 against the charge pressure when the load becomes large and the hydraulic pressure in the main oil path 13 becomes high in the vehicle speed range b. In other words, the midway portion 27c is turned to the low-speed side, a capacity of the hydraulic motor is increased to reduce the hydraulic pressure in the main oil path 13, and the traction is enhanced. At this time, because the spring pressure is added to the charge pressure in the space 42a on the hydraulic pump side, the spool 40 does not slide and is retained on the high-speed side. When the load reduces, the hydraulic pressure in the main oil path 13 reduces and the charge pressure pushes the spool 140 to return the midway portion 27c to the position set by the speed change pedal.

The above-described load control mechanisms 4, 104 may be provided to the hydraulic pump 10 only or the hydraulic motor 11 only or both of the hydraulic pump 10 and the hydraulic motor 11, and may be provided selectively in consideration of types of the work and the traveling vehicle, the load, and the like.

As described above, by pressing the spools 40, 140 of the load control mechanisms 4, 104 with the pins 44, 144 that slide when they receive the pressurized oil from the main oil path 13, and by pressing the other ends of the spools 40, 140 with the charge pressure counteractingly, the charge pressure necessary for the HST 1 can be utilized, the hydraulic pump 10 and the like can be controlled automatically with the simple structure, and the elastic member can be downsized to obtain an inexpensive biasing means. The spools 40, 140 can be slid accurately, accuracy of control of the movable swash plates 10a, 11a by the load control mechanisms 4, 104 is enhanced, and the load control mechanisms 4, 104 can be made compact.

Next, a control mechanism during reverse traveling of the HST 1 will be described below. FIG. 12 shows a relationship between a relief pressure curve C of a transmission and an engine horsepower curve A. The HST 1 restricts a reverse-side capacity of the hydraulic pump 10 so that a corner horsepower d becomes slightly lower than an engine output, and the relief pressure curve C in the hydraulic motor control region during the reverse traveling does not exceed but substantially agrees with the engine horsepower curve A. In other words, a point where a switch from the speed control by the hydraulic pump 10 to the speed control by the hydraulic motor 11 is defined as a corner horsepower d, the above-described load controls for actuating the load control mechanisms 4, 104 with the pressurized oil from the main oil path 13 are not carried out during the reverse traveling and the hydraulic pressure is relieved when the hydraulic pressure in the main oil path 13 exceeds a set pressure. When the gears are shifted to the reverse traveling side, the movable swash plate 10a of the hydraulic pump 10 is turned to a minus side (from the neutral position to a side opposite to the forward traveling direction). Then, another main oil path 13R as a closed circuit of the HST 1 during the rearward traveling becomes high-pressure and therefore the load control mechanism 4 is not actuated. To prevent the corner horsepower d of the engine 15 from exceeding the engine horsepower curve A, the relief valves 54 are actuated and the pressurized oil from the hydraulic pump 10 does not drive the hydraulic motor 11, but stops traveling to thereby avoid stalling.

As described above, the HST 1 carries out the control so that the movable swash plates 10a, 11a are tilted by the load control mechanisms 4, 104 when the load is applied during the forward traveling to automatically reduce the vehicle speed and to increase the traction. During the reverse traveling, however, without using the load control mechanisms 4, 104, the pressurized oil is relieved to prevent stalling at low cost and without impairing traveling performance. An operator need not properly carry out speed change operation in order to prevent stalling during the reverse traveling and the structure is simplified. Even when traveling stops, the operator can depress a traveling pedal (not shown) or the like again to start traveling, which saves the operator from having to restart the engine 15 after stalling.

In the embodiment, in the transmission structure of the work vehicle, in addition to a main speed changing mechanism using the HST 1, it is also possible to use a hydraulic/mechanical stepless speed changing device (HMT) that combines the HST 1 and a differential mechanism, because the HMT is excellent in operability at the time of speed change and in energy efficiency. Specific structures related to the HMT are already known and will not be described specifically in the present specification.

What is claimed is:
1. A hydraulic stepless speed changing device, comprising:
a variable displacement hydraulic pump having a movable pump swash plate;
a variable displacement hydraulic motor having a movable motor swash plate;
a closed circuit including a main oil path connecting the hydraulic pump and the hydraulic motor to each other;
a hydraulic servo mechanism for controlling swash plate angles of the respective movable pump and motor swash plates, wherein the hydraulic servo mechanism includes:

a pump speed change drive member for tilting the pump swash plate according to operation of a pump speed change operation lever, and a motor speed change drive member for tilting the motor swash plate according to operation of a motor speed change operation lever;

a housing incorporating the hydraulic pump, the hydraulic motor, the closed circuit and the hydraulic servo mechanism together;

a pump load control mechanism formed on the housing on the hydraulic pump side of the hydraulic servo mechanism, wherein the pump load control mechanism includes:

a cylinder to and from which the pressurized oil in the main oil path is supplied and discharged, a slide member slidably inserted in the cylinder and adapted to be engaged with the pump speed change drive member, and an elastic member for biasing the slide member to one end side of the slide member, wherein the main oil path communicates with the one end side of the slide member, and wherein pressurized oil led from the main oil path to the cylinder of the pump load control mechanism moves the slide member against a biasing force of the elastic member so as to engage the slide member with the pump speed change drive member and to further move the slide member and the pump speed change drive member, thereby tilting the pump swash plate in a direction for reducing an output speed of the hydraulic motor independently of the tilting operation through the pump speed change operation lever; and a motor load control mechanism formed on the housing on the hydraulic motor side of the hydraulic servo mechanism, wherein the motor load control mechanism includes:

a cylinder to and from which pressurized oil in the main oil path is supplied and discharged, a slide member slidably inserted in the cylinder and adapted to be engaged with the motor speed change drive member, and an elastic member or a hydraulic force provided for biasing the slide member to one end side of the slide member, wherein the main oil path communicates with the one end side of the slide member, wherein pressurized oil led from the main oil path to the cylinder of the motor load control mechanism moves the slide member against a biasing force of the elastic member or the hydraulic force so as to engage the slide member with the motor speed change drive member and to further move the slide member and the motor speed change drive member, thereby tilting the motor swash plate independently of the tilting operation through the motor speed change operation lever, and wherein, when hydraulic pressure in the main oil path is increased so as to cause excessive load on a prime mover for driving the hydraulic pump, at least one of the pump load control mechanism and the motor load control mechanism is actuated by the pressurized oil led from the main oil path into the corresponding cylinder so as to tilt the pump or motor swash plate in the direction for reducing the output speed of the hydraulic motor, thereby controlling the load.

2. The hydraulic stepless speed changing device according to claim 1, wherein at least one of the pump load control mechanism and the motor load control mechanism includes a pin for pressing the slide member when it receives the pressurized oil in the main oil path is provided to one end side of a cylinder hole of the cylinder, in which the slide member is inserted, and charge pressure is introduced to the other end side of the cylinder hole to resist the pressing of the slide member by the pin.

3. The hydraulic stepless speed changing device according to claim 2, wherein at least one of the pump load control mechanism and the motor load control mechanism includes an inner cylinder provided to a portion of the cylinder hole, wherein a pin hole is formed in the inner cylinder, wherein the pin is inserted into the pin hole while being in close contact with an inner wall of the pin hole, and one end portion of the pin is in contact with the face of the slide member opposite to the elastic member or hydraulic force.

4. The hydraulic stepless speed changing device according to claim 1, wherein the pump load control mechanism controls the swash plate angle of the movable swash plate of the hydraulic pump so that traction of the hydraulic speed changing device during low-speed traveling becomes substantially half of traction of an engine horsepower.

5. The hydraulic stepless speed changing device according to claim 1, wherein a reverse-side capacity of the hydraulic pump is restricted to make a corner horsepower slightly lower than an engine output and thus a relief pressure curve in a hydraulic motor control region during reverse traveling substantially agrees with an engine horsepower curve without exceeding it.

6. The hydraulic stepless speed changing device according to claim 1, wherein at least one of the pump load control mechanism and the motor load control mechanism includes a stopper portion formed to protrude from an inner wall of the cylinder to restrict a sliding movement of the slide member so as to restrict the tilt of the pump or motor swash plate to the speed reduction side.

7. The hydraulic stepless speed changing device according to claim 1, further comprising:

a neutral position retaining mechanism for retaining the pump speed change drive member so as to retain the pump swash plate at a neutral position.

8. The hydraulic stepless speed changing device according to claim 1, wherein the pump speed change operation lever and the motor speed change operation lever are operatively associated with each other so that the pump speed change operation lever is operable to tilt the pump swash plate only when the motor swash plate is set at a swash plate angle for realizing a maximum displacement of the hydraulic motor, and that the motor speed change operation lever is operable to tilt the motor swash plate only when the pump swash plate is set at a swash plate angle for realizing a maximum displacement of the hydraulic pump.

9. The hydraulic stepless speed changing device according to claim 8, wherein the pump load control mechanism is actuatable to tilt the pump swash plate only when the motor swash plate is set at the swash plate angle for realizing the maximum displacement of the hydraulic motor, and wherein the motor load control mechanism is actuatable to tilt the motor swash plate only when the pump swash plate is set at the swash plate angle for realizing the maximum displacement of the hydraulic pump.

* * * * *